United States Patent [19]

Anthony, Jr. et al.

[11] Patent Number: 4,804,557
[45] Date of Patent: Feb. 14, 1989

[54] THICKNESS CONTROL SYSTEM HAVING A DUTY CYCLE CONTROLLER

[75] Inventors: John D. Anthony, Jr., Wilmington, Del.; Kenneth W. Leffew, Kennett Square, Pa.

[73] Assignee: E. I. DuPont de Nemours and Company, Wilmington, Del.

[21] Appl. No.: 646,174

[22] Filed: Aug. 30, 1984

[51] Int. Cl.$^4$ .................................................. B05C 5/02
[52] U.S. Cl. ........................................ 427/9; 118/665; 118/696; 118/410; 264/40.1; 425/141; 425/466
[58] Field of Search ..................... 427/9, 10; 264/40.1; 425/141, 466; 118/663, 665, 696, 410

[56] References Cited

U.S. PATENT DOCUMENTS

| 3,940,221 | 2/1976 | Nissel | 425/466 X |
| 4,454,084 | 6/1984 | Smith et al. | 264/40.1 |
| 4,507,073 | 3/1985 | Shelton | 425/141 X |

Primary Examiner—John McIntosh

[57] ABSTRACT

A thickness control system for controlling the thickness of an extrudate includes a host computer for controlling the temperature of a heat responsive element based upon a predetermined temperature set point. A back-up duty cycle controller is provided for control in the event of host failure.

7 Claims, 14 Drawing Sheets

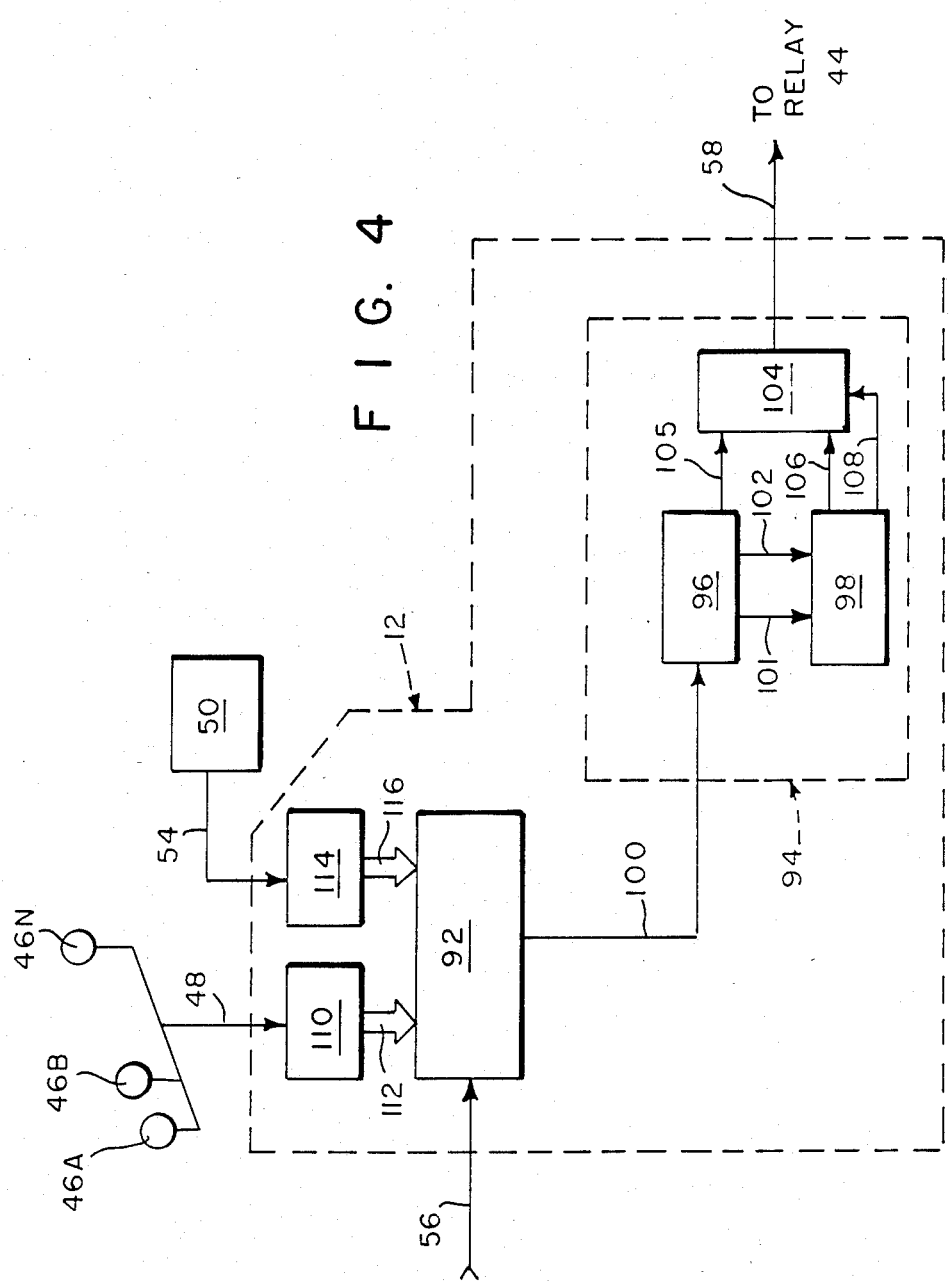

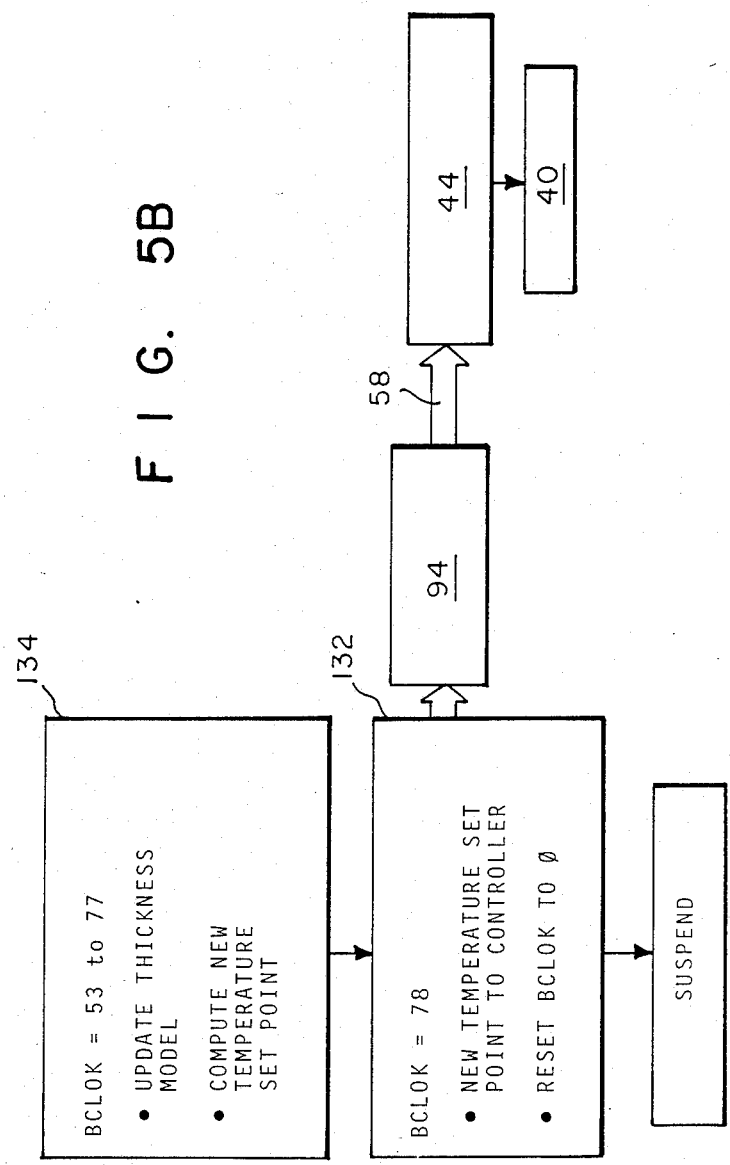

THICKNESS CONTROL SYSTEM HAVING A DUTY CYCLE CONTROLLER

FIELD OF THE INVENTION

This invention relates to a control system for an extrusion coating apparatus which controls the duty cycle of a heat responsive element which modulates the coating die slot dimension and, in particular, to a control system having a back-up duty cycle controller operable in the event of host computer failure.

DESCRIPTION OF THE PRIOR ART

An extrusion coating apparatus is a device wherein a composition is forced under pressure through an opening, or slot, defined between a confronting pair of relatively massive members called dies. One die includes a relatively flexible flange, or lip, which extends transversely of the die while the other of the dies carries a fixed lip also extending transversely of the die. The slot dimension is defined by the perpendicular distance between corresponding points on the lips of the confronting dies and it is this slot dimension which determines the thickness of the extrudate emanating from the apparatus.

In practice the extrudate may be deposited onto a suitable substrate or may form a film which is carried by a suitable conveyer arrangement. The thickness of the extrudate, whether deposited on a substrate or extruded in film form, is monitored downstream of the dies by a suitable gauge. Depending upon the measured thickness the slot dimension is appropriately modified.

One well known device for controlling the slot dimension involves the use of a plurality of heat responsive expansion bolts arrayed in spaced apart relationship across the transverse dimension of one die. Typical of such expansion bolts are those manufactured and sold by Thermac Corp. Each bolt operates against a localized portion of the flexible lip of the die on which the bolt is mounted. Dependent upon the duration of the excitation signal applied thereto the heat responsive bolt either expands or contracts from its previous condition to thereby respectively close or open the dimension of the slot in the vicinity of the bolt. Each bolt, therefore, is operative to modify the slot dimension in one of a corresponding plurality of contiguous lanes extending transversely across the width of the die.

The duration of the excitation signal applied to each bolt is functionally related to the thickness of the extrudate emanating from the die in the section of the film affected by that bolt as monitored by the thickness gauge. However, commercially available equipment such as defined above uses minimum sample control intervals on the order of two minutes. This results in a characteristic response time of approximately sixty minutes. The duration of these sample intervals and response times is believed to be unable to provide the degree of thickness control necessary for more critical and precise extruding operations.

The present thickness control scheme has other perceived disadvantages. One relates to the inability to control the thickness of the extrudate deposited in the lanes contiguous to the lateral boundaries of the die. Extruding near these boundaries results in a phenomenon known as "neck-in" in which the extrudate bends inwardly, i.e., away from the edges, and occasions a relatively thicker bead of extrudate forming in these regions. Another perceived disadvantage is the failure to accurately relate monitored thickness of the extrudate to the portion of the die (i.e., the lane) from which that extrudate emanated. Another disadvantage lies in the failure to provide a suitable system backup in the event of controller malfunction. Currently, a controller malfunction would result in the cessation of manipulation over the expansion bolts. Thus, over time after a malfunction, the die slot could achieve an arbitrary form which would lead to undesirable thickness nonuniformity across the web. As a corollary, when system control is restored the controller must readjust the dies to accommodate the deviations introduced during controller down time before thickness control may be reestablished.

In view of the foregoing it is believed advantageous to provide a control system in which increased sample frequency and decreased response times are available. Further, a system for reducing the effects of neck-in is also believed to be of advantage. Yet further, a system which accurately monitors and relates extrudate thickness to the portion of the die from which the extrudate emanated would be advantageous. Still further, a control system which provides a back up control scheme in the event of malfunction is also believed to provide an improvement over prior control systems.

SUMMARY OF THE INVENTION

The present invention relates to an extrusion coating apparatus of the type having a first and a second die, one of the dies having a flexible lip thereon while the other of the dies carries a rigid lip. The lips are spaced apart to define an elongated, transversely extending extrusion slot. An array of heat responsive elements is transversely spaced across the die having the flexible lip to provide localized slot control over each one of a plurality of transversely contiguous lanes. A thickness gauge is disposed downstream of the dies in a location where the thickness of the extrudate from each lane may be monitored. Preferably, a scanning-type gauge is used. Each heat responsive element includes, in the preferred case, a bolt having a heating element arranged in a heat transmissive association therewith.

In accordance with the present invention the thickness control system comprises a nested temperature control network for maintaining the temperature of the heat responsive element associated with a given lane within a predetermined range of a predetermined temperature set point. The temperature set point is generated in response to the monitored thickness of the extrudate. In the preferred embodiment the temperature control network includes a temperature sensing element, such as a thermocouple, physically disposed in a temperature monitoring relationship with the heat responsive element. The monitored temperature is used by the temperature control network to maintain the temperature of the heat responsive element at the predetermined temperature set point derived in accordance with the monitored thickness of the extrudate. Since the temperature control network responds faster to correct deviations from the predetermined temperature set point than the thickness control loop in which it is nested, more effective control of the slot dimension is afforded than is available in prior art systems which manipulate the slot dimension directly on the basis of monitored extrudate thickness. Also included is an arrangement which accurately correlates the monitored thickness of the extrudate with the portion of the die (i.e., the lane) from which that portion of the extrudate emanated so that the appropriate heat responsive elements are controlled to manipulate the appropriate portion of the slot.

The thickness control system also includes an arrangement which adjusts the temperature set point of the heat responsive elements lying within a predetermined range of contiguity to the lateral boundaries of the die based on the change in temperature set point of a selected one of the more laterally interior heat responsive elements. Such an arrangement serves to reduce the deleterious effects of extrudate neck-in.

The thickness control system further includes an arrangement which monitors the duration of the excitation signal (i.e., duty cycle) for each heat responsive element and maintains a running average thereof which is updated at predetermined intervals. In the event of system malfunction the current duty cycle signal for each element, based on the historical trend of temperature control for that element, is used as the control output until real-time control is restored.

Preferably the thickness control system is implemented by a distributed computer system. A host computer is used to calculate updated temperature set points based on monitored thickness measurements and the corresponding heater duty cycle time required to maintain the actual temperature at the set point. Each bolt has a dedicated software control loop executed by the host. The distributed control system also includes a primary and auxiliary microcomputer. The primary microcomputer serves to control the required duty cycle of the heaters for all the heat responsive elements. The auxiliary microcomputer tracks the duty cycle of the elements, generates the historical trend in the form of running averages and, in the event of host failure, supplies this information to the primary microcomputer to use for the heater control until host operability is restored.

BRIEF DESCRIPTION OF THE DRAWINGS

The invention will be more fully understood from the following detailed description thereof taken in connection with the accompanying drawings, which form a part of this application and in which:

FIG. 4 is a block diagram of the distributed computation arrangement used in the thickness control system of the present invention;

FIGS. 5A and 5B are a program timing and data flow diagram for the program used in a thickness control system of the present invention;

DETAILED DESCRIPTION OF THE INVENTION

Figure 1:
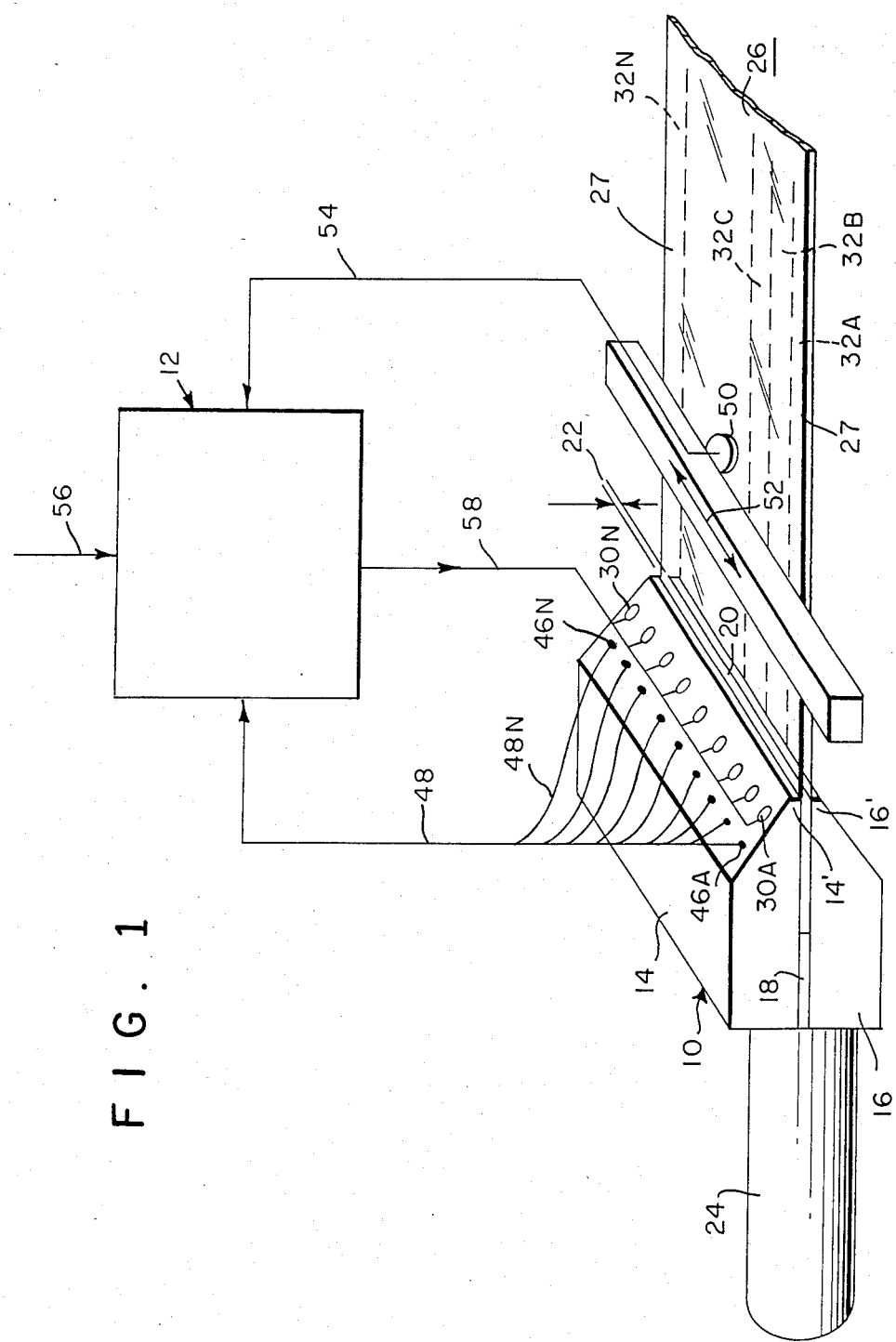
FIG. 1 is a stylized pictorial presentation of an extrusion coating apparatus with which a thickness control system in accordance with this invention may be used.

Throughout the following detailed description similar reference numerals refer to similar elements in all FIGS. of the drawings.

With reference to FIG. 1 shown is a generalized schematic representation of an extrusion coating apparatus generally indicated by reference character 10 with which a thickness control arrangement indicated by reference character 12 may be used. The coating apparatus 10 includes an upper die member 14 and a lower die member 16 separated by a shim 18 to define a transversely extending slot 20 having a thickness dimension 22. The thickness dimension 22 is defined as the perpendicular distance between corresponding confronting points on the dies 14, 16. A composition to be extruded is introduced into the apparatus 10 from an extruder 24. A film 26 of extrudate emanates from the spaced apart dies 14, 16. The film 26 may be beaded in the vicinity of its lateral edges 27 due to the effects of neck-in. the film 26 may be deposited on a suitable substrate or conveyer both omitted from the FIG. for clarity. It should be understood that the thickness control arrangement 12 is able to control the thickness of a single film extrudate or the total thickness of a multiplicity of film extrudates including the control of overall thickness where a single or multiple film extrudate is extruded onto a substrate.

Figure 2:
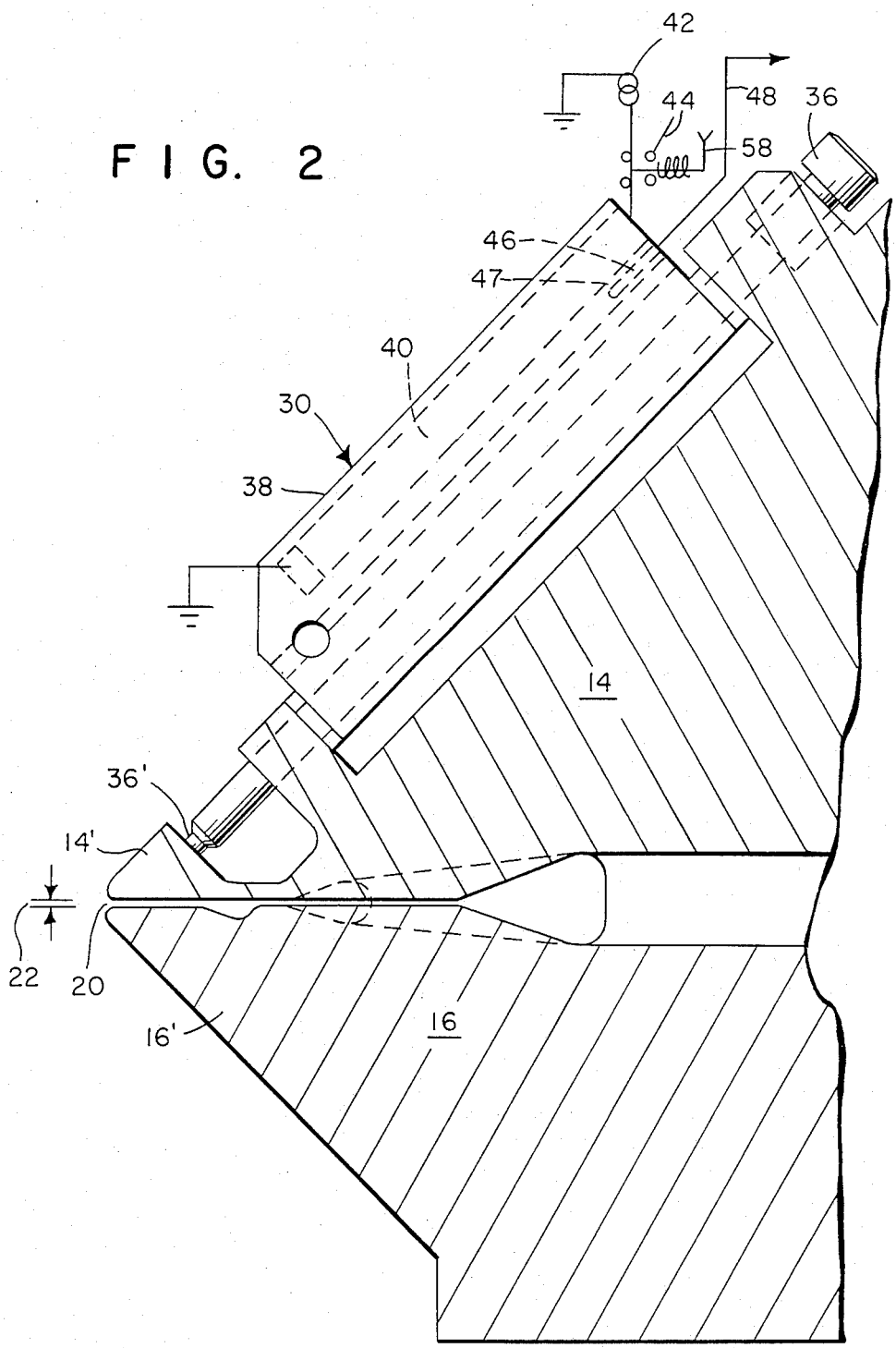
FIG. 2 is a detailed view of the physical mounting of a heat responsive expansion bolt and a temperature monitoring element associated therewith in accordance with the present invention.

As seen in FIG. 2, each die 14, 16 includes a forwardly extending lip 14', 16' respectively. One of the lips, e.g., the lip 14', is flexible while the other of the lips 16' is rigid. Of course, the relative positions of the flexible and rigid lips may be reversed. Also, both of the lips could be flexible and controlled as discussed herein.

An array of heat responsive elements 30 is arranged across the transverse dimension of the upper of the dies 14 having the flexible lip 14' thereon. Each element 30 is operatively associated with the lip 14' and is arranged, as set forth herein, to modulate the thickness dimension 22 of the portion of the slot 20 in the vicinity of the element. Consequently each element 30 may be viewed as controlling the thickness 22 of one of a plurality of N transversely contiguous lanes 32A through 32N arrayed across the transverse dimension of the film 26. It should be understood that any predetermined convenient number N of such lanes may be used. Throughout this application, the use of an alphabetic suffix for any element or function indicates that element or function which corresponds with the lane with which the suffix is associated.

Each of the heat responsive elements 30 is preferably a heat expansion bolt 36 mounted in a block 38 formed of a heat conductive material. The blocks 38 are received in any appropriate receptacle formed in the die 14. A cartridge heater 40 is mounted in a heat transmissive relationship within a suitable recess formed in the block 38. The foot 36' of each of the bolts 36 is abutted against the flexible lip 14L of the die 14. The bolt 36 expands or contracts and thereby narrows or widens the thickness dimension 22 of the portion of the slot 20 in the vicinity thereof. The expansion or contraction of the bolt 36 is controlled by the temperature of the block 38 which temperature is, in turn, dependent upon the magnitude of the electric current flowing in a closed loop including the heater 40 and a source 42. A relay diagrammatically indicated at 44, preferably a solid state relay, controls the application of the current to the heater 40 under the control of the network 12 as discussed herein.

In accordance with the invention a temperature monitoring device, such as a thermocouple 46, is physically mounted in a temperature sensing relationship with the block 38 within a suitably located aperture 47 therewith. The aperture 47 may be located at any convenient position within the block 38. The signal developed by each of the thermocouples 46 is separately conveyed by an associated line 48 to the control network 12. The thickness dimension 22 of the slot 20 in the vicinity of each heat responsive element 30 is, as may be appreciated, functionally related to the temperature of the block 38.

Disposed a predetermined distance from the extrusion apparatus 10 is a thickness gauge 50 arranged to scan transversely in the direction of the arrow 52 and to monitor the thickness of the film 26 in each of the lanes 32A through 32N, respectively. The electrical signal representative of the monitored film thickness is applied via a line 54 to the control system 12. Suitable for use as the gauge 52 is a device sold by LFE Incorporated, Waltham, Mass., under model number 5001. The signals 54A through 54N representative of the thickness of the extrudate in the corresponding lane is derived by a scheme that, once knowing the transverse location of the film edge beads 27, apportions data from the thickness scan to each bolt lane in accordance with observed neck-in characteristics for that region of the die. An essential part of this process is the identification of the edge beads 27. The program which implements this function is set forth in full in the Appendix.

Figure 3:
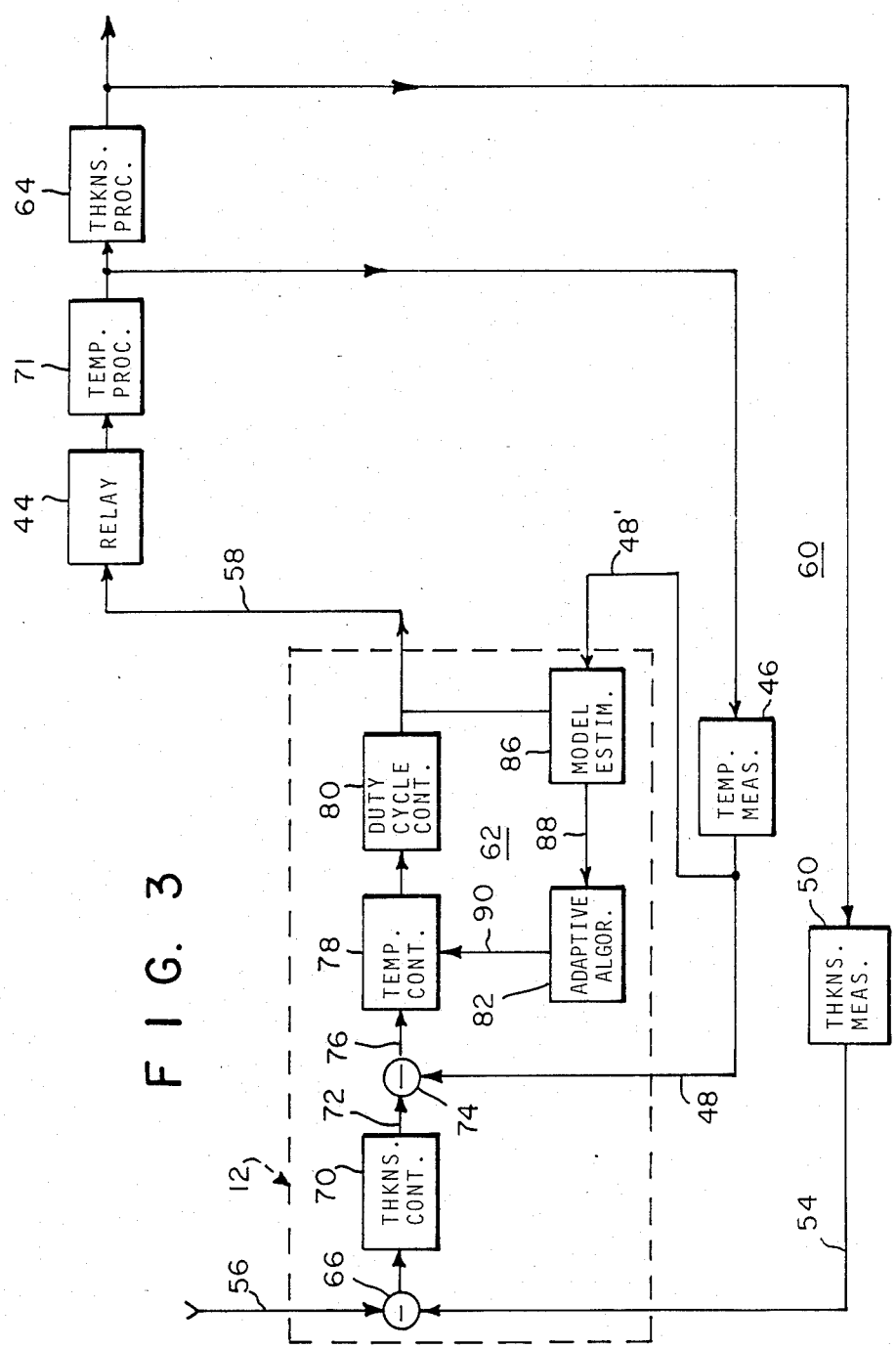
FIG. 3 is a functional block diagram of the thickness control system in accordance with the present invention.

The thickness control system 12 in accordance with the present invention is shown in block diagram form in FIG. 3. The system 12 is operative to maintain the thickness of the extrudate within a predetermined range of the thickness reference as selected by an operator and applied to the system 12 as an appropriate reference signal on the line 56. The control system 12 is responsive to the signal representative of the temperature each of the heat responsive elements 30 as derived from the thermocouple 46 associated therewith and applied over the appropriate line 48 and to the signal representative of the thickness dimension 22 of the portion of the slot 20 in the lane corresponding to the element 30 as applied from the gauge 52 over the line 54. The control function is implemented by a control signal applied on a line 58 connected to the relay 44 corresponding to the element 30.

The control system 12 which controls the thickness of the extrudate in each of the lanes 32A through 32N includes, for each lane, an outer thickness control loop 60 and a nested, inner, temperature control loop 62.

A physical process, schematically indicated by the functional block 64, results in the creation of a extrudate having a thickness to be controlled. The physical process is implemented by the coating apparatus 10 described above. The thickness of the extrudate is measured by the gauge 50 and information representative thereof applied over the line 54 where it is subtracted at a junction 66 from the thickness set point signal selected by an operator and applied on the line 56. A thickness control algorithm represented by the functional block 70 (a program implementing the same being shown in flow diagram form in FIGS. 6A and 6B) generates on a line 72 a temperature set point which is used to generate a reference for the inner temperature control loop 62.

Figure 7A:
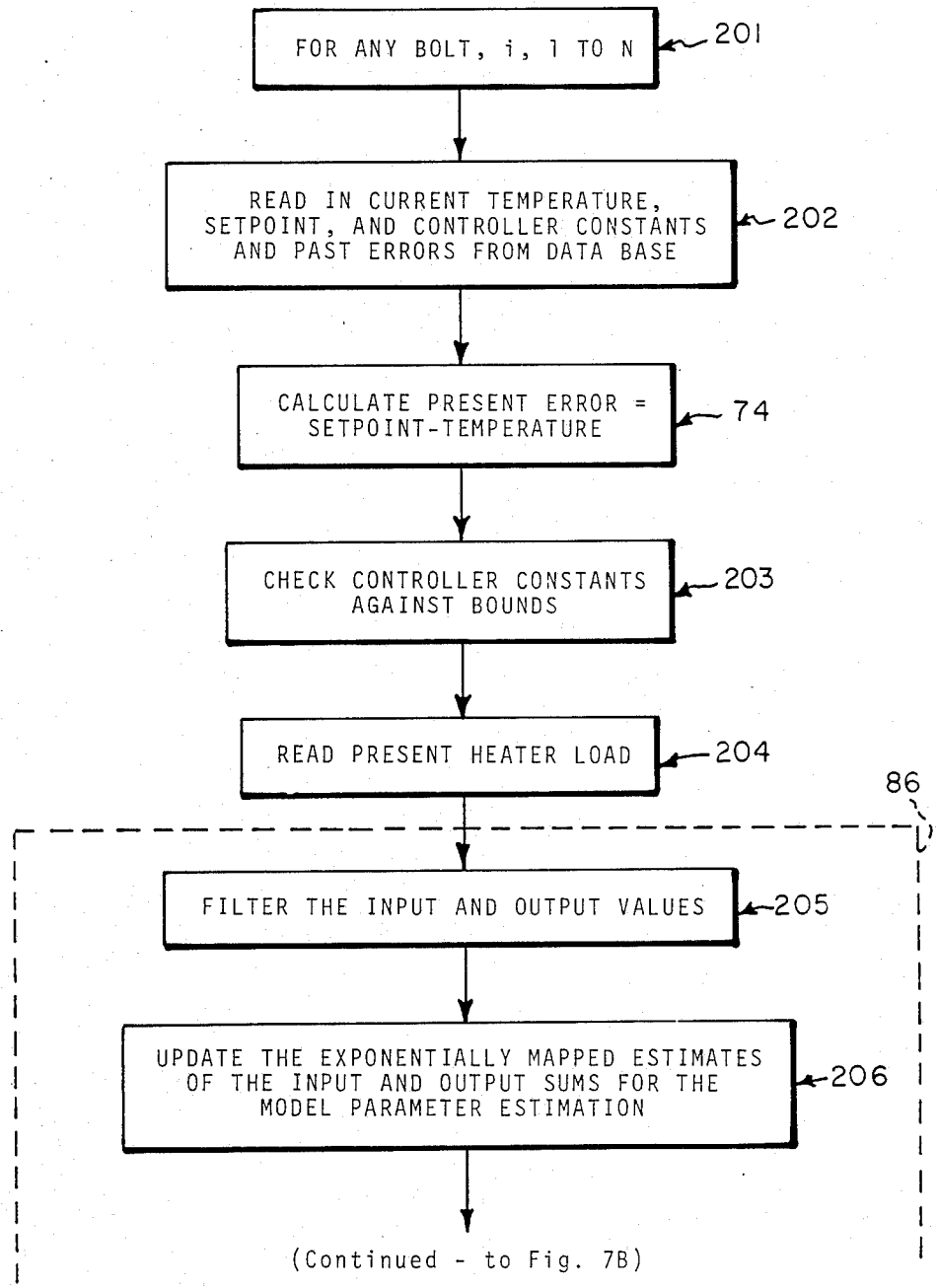

The physical process by which each heat responsive element 36 associated with each lane 32 is heated (e.g., by the passage of current) is indicated by the functional block 71. The temperature of each element 36 is monitored by its associated thermocouple 46 and is applied over the appropriate line 48 to a junction 74. The information on the line 76 represents the difference, or error, of the temperature set point and the measured temperature and is applied to a temperature control algorithm indicated by the functional block 78. The temperature control algorithm is implemented by the program shown in flow diagram form in FIGS. 7A and 7B. The output of the temperature control algorithm 78 is applied as a switch control signal output from a duty cycle controller indicated by the functional block 80 to the relay 44. The proportion of a predetermined time window (e.g., 1.666 seconds) that the switch control signal on the line 58 is in a selected state represents the duty cycle of a heater, i.e., the percentage of the predetermined time window in which the heater is asserted. Any suitable heater time window duration may be used.

The thickness measurement which serves as the basis of the temperature set point as described above is made at a predetermined thickness sample rate on the order of fifty seconds (although any suitable thickness sample rate may be used). However, temperature control is effected by the nested inner temperature control loop 62 at an increased temperature sample rate, on the order of seven seconds (although any other suitable rate may be used) thereby providing the system 12 with the ability to more quickly and efficiently bring the temperature of the element 36 to a desired level and maintain it at that level. It is in this manner that the thickness of the extruded film 26 is maintained at a predetermined uniform dimension.

Figure 7B:
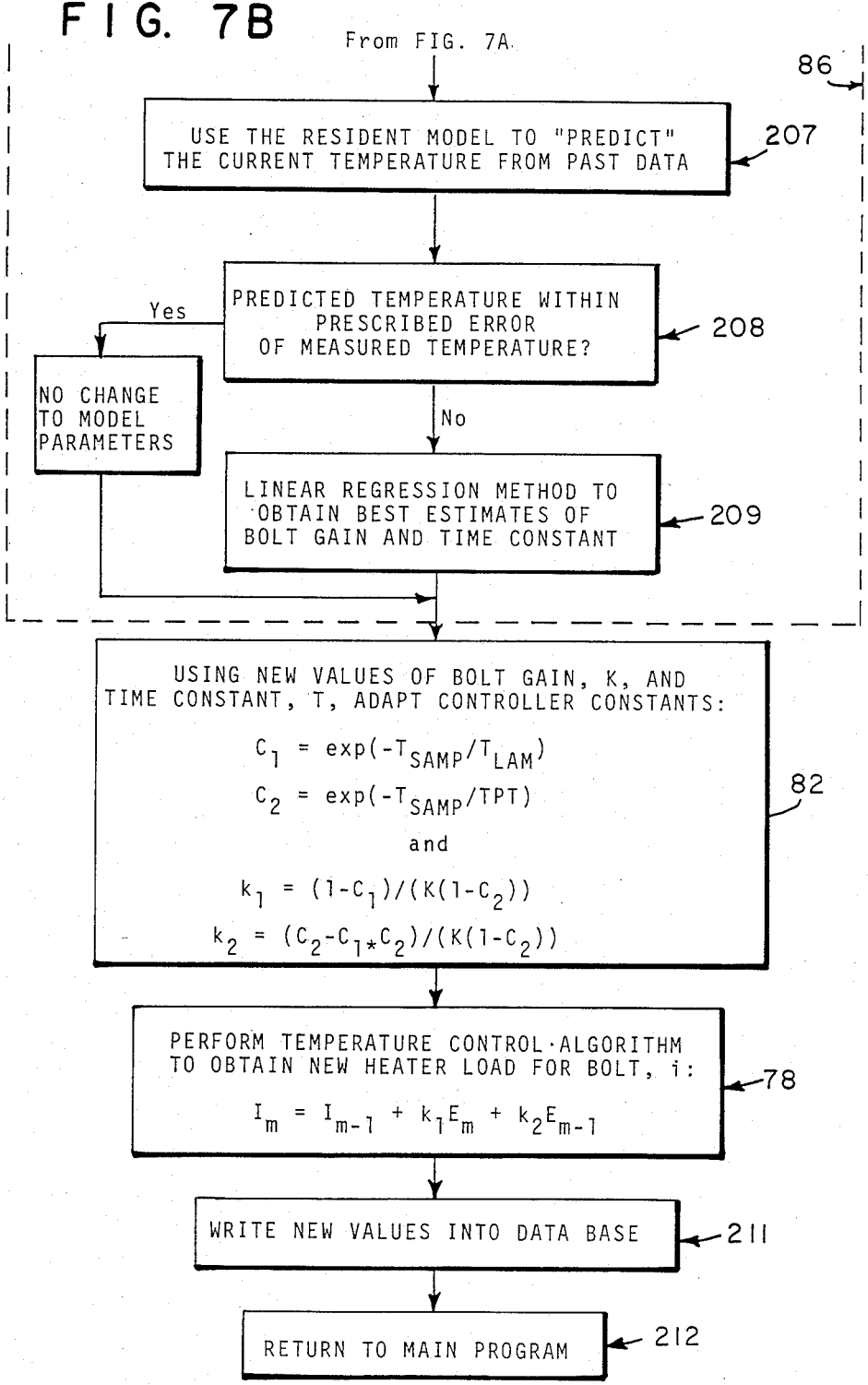

The inner temperature control loop 62 includes a control parameter adapter algorithm indicated by the functional block 82 (implemented by the program disclosed in flow diagram disclosed in FIG. 7B) implemented in an on-line process identification technique. The actual temperature of a given bolt 36 is applied over a line 48' from the thermocouple 46 and is applied over a line 48' from the thermocouple 46 and is applied along with the duty cycle signal on the line 58 to a model parameter estimator indicated by the functional block 86. The estimated model parameters calculated in the functional block 86 are applied over the line 88 to the control parameter adapter algorithm represented by the functional block 82. The functional blocks 82 and 86 function, in combination, to provide an adaptive temperature control arrangement. As a result control parameters are output on the line 90 to the temperature control algorithm indicated by the functional block 78. A functional block 78 operates on the temperature error signal on the line 76 to adjust the analog signal applied to the duty cycle controller 80 and thereby to the relay associated with the bolt to adjust the duty cycle in a manner which acts to eliminate the temperature error associated with that bolt. Typically the operation of the inner loop 62 results in a duty cycle modification once every seven seconds. Of course any other predetermined rate may be selected. It is noted that because of the adaptive nature of the algorithm decoupling of the output of the thickness controller 70A through 70N is not needed.

As best seen in FIG. 4 the thickness control system 12 is physically implemented in the preferred embodiment using a distributed processing network comprising a host computer 92 connected with a microprocessor based relay controller 94. The controller 94 includes a primary microcomputer 96 and an auxiliary microcomputer 98. Suitable for use as the host 92 is a Hewlet-Packard HP-1000L minicomputer. The primary microcomputer 96 and the auxiliary microcomputer 98 are implemented using an Intel 8748 single chip microcomputer. Of course, any suitable components may be used to implement the network 12 and remains within the contemplation of the present invention.

The host 92 communicates with the controller 94 over a data link 100 connected directly to the primary microcomputer 96. The primary microcomputer 96 is connected to the auxiliary microcomputer 98 over a data link 101 and a control link 102. Each of the microcomputers 96, 98 is respecively connected to a data switch 104 via a data link 105 or 106. The switch 104 is asserted in accordance with the state of a data control line 108 to apply the switch control signal representative of a heater duty cycle on either the lines 105 or 106 to the solid state relay 44 associated with that heater. The state of the line 108 is determined by monitoring the data line 100 from the host 92 to the primary microcomputer 96. For example, if the primary microcomputer 96 is receiving data from the host 92 the switch 104 is closed by the signal on the line 108 to connect the lines 105 and 58. Otherwise the switch 104 is controlled to connect the lines 106 and 58 when data transmissions are not received by the primary microcomputer 96 from the host 92.

The host 92 interfaces with the thermocouples 46A through 46N through an interface 110 via a bus 112. The thickness gauge 50 is connected through a buffer 114 and a bus 116 to the host 92.

Figure 5A:
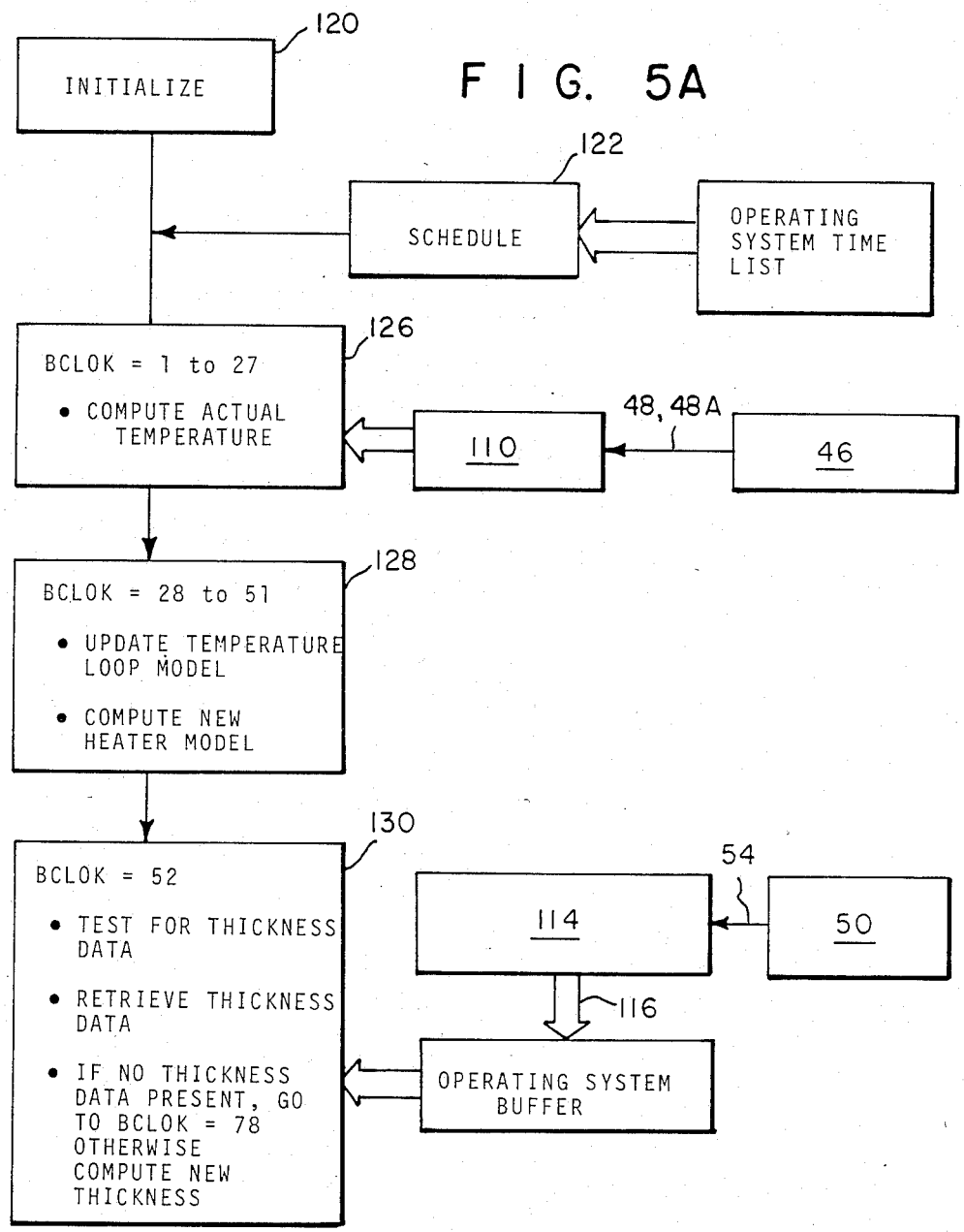

The operation of the thickness control system 12 in accordance with the present invention may be understood from the overall system timing and data flow diagram shown in FIGS. 5A and 5B. The discussion is set forth in terms of a twenty-four channel apparatus (N equal twenty four) and timing is defined in terms of clock intervals (BCLOK) defined by the master clock of the host 92.

After an initialization sequence as indicated by the computational block 120 the control program is initiated by an output from a schedule control computational block 122 under control of the operating system time list 124. During the first computational block 126 defined by the host clock intervals one to twenty-seven (BCLOK=1 to 27) the host 92 interrogates the outputs of the thermocouples 46 as applied through the interface buffer 110. The host uses this information of the monitored temperatures to derive the value of the corresponding actual temperatures of each of the expansion bolts 36.

The next program sequence indicated by the computational block 128 implements the temperature control function indicated schematically in the functional block 78 to derive an updated heater control signal. This computation is based upon the temperature set points prescribed as a result of the last-preceding thickness monitoring and the current value of the measured temperature control algorithm indicated by the functional block 78, using updated control parameters 90 derived from the adaptive algorithm represented by the functional block 82. The flow diagram of the temperature control program (including the adaptive algorithm 82) is set forth in FIGS. 7A and 7B.

During the computational block 130 defined by the host time interval corresponding to BCLOK=52 the host 92 checks the interface 114 to ascertain if an updating of the thickness measurement has occurred. If not, host computational activity is suspended until time interval corresponding to BCLOK=78 shown in the computational block 132. At this time (BCLOK=78) the updated heater control outputs computed during the computational block 128 are applied to the relay controller 94 which applies the updated heater duty cycle signal on the line 58 to the relay 44 of the particular bolt 36. The updating action of the temperature control loop 62 as described in connection with functional blocks 78, 80, 82 and 86 (FIG. 3) as implemented during computational blocks 126 and 128 (FIG. 5A) occurs at a repetition rate faster than the thickness computation rate to be described. Preferably the inner temperature control loop 62 is executed approximately once every seven seconds.

If the thickness monitoring has occurred when queried in the computational block 130 the host retrieves this information. The raw information, which contains data for all N lanes, is used to compute corresponding film thickness for all lanes.

The computational block 134 defined in host time interval corresponding to BCLOK=53 to 77 implements the thickness control depicted in the functional block 70 and computes a new temperature set point (the signal on the line 72) for each lane. The flow diagram of this program is set forth in FIGS. 6A and 6B. The new temperature set point derived as described is used during each succeeding temperature control loop (computational blocks 126 and 128) that occurs intermediate successive thickness monitorings. The thickness control loop 60 corresponding to the computational blocks 130 and 134 occurs once every fifty seconds in the preferred case.

Figure 6A:
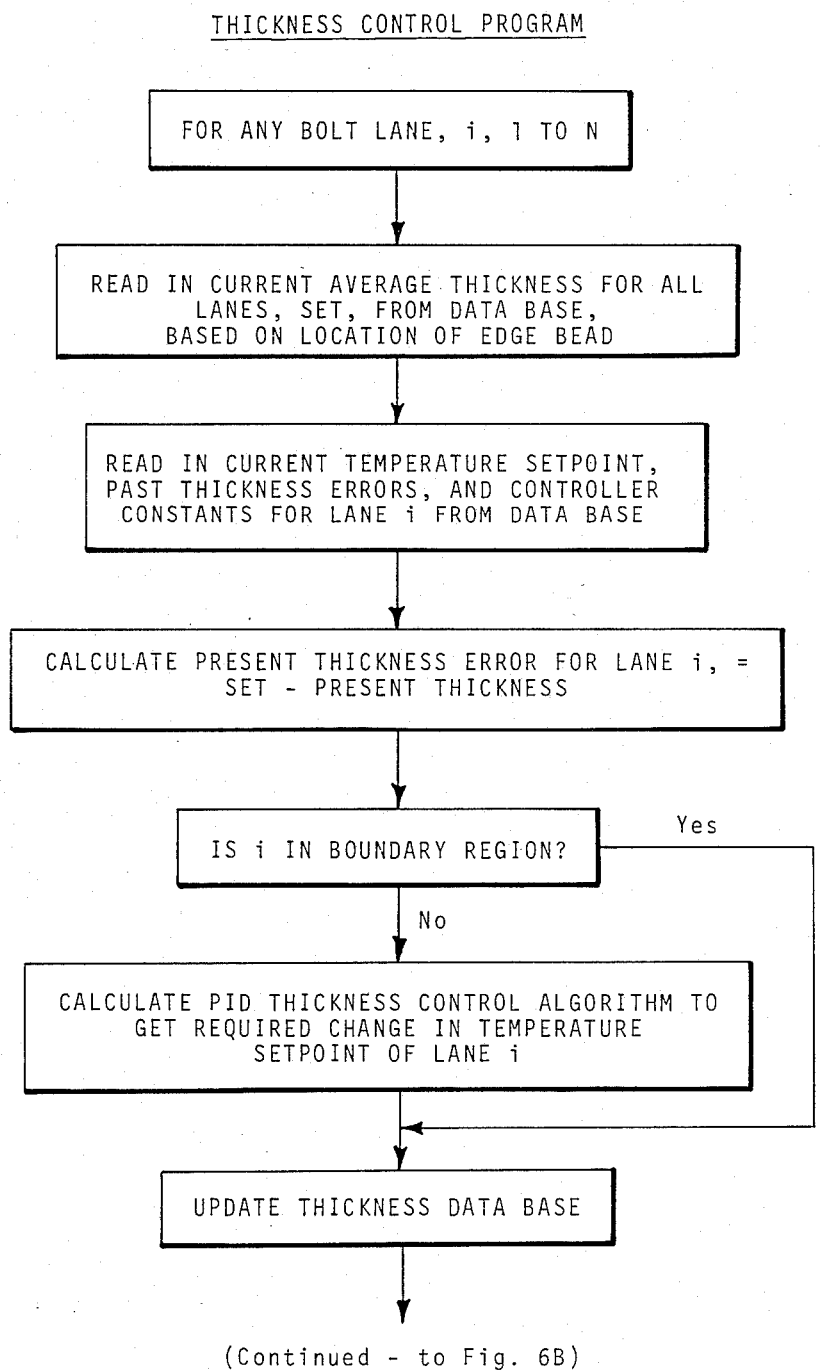
FIGS. 6A, 6B and 7A, 7B are respectively flow diagrams of the programs implementing thickness control algorithm and the temperature control algorithm (including the adaptive algorithm) used in the control system of the present invention.
Figure 6B:
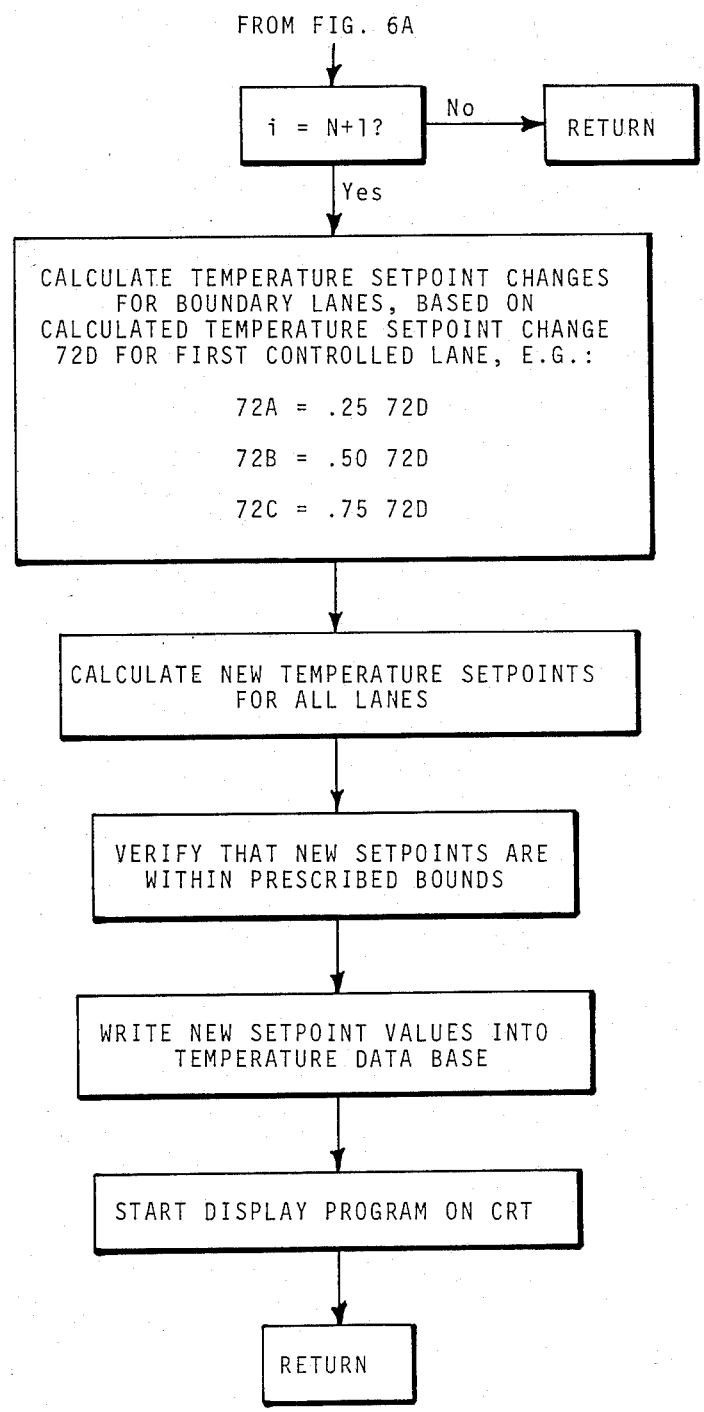

With particular reference to the thickness control program shown in FIGS. 6A and 6B as executed during the computational block 130 (FIG. 5A) to implement the functional block 78 (FIG. 3) it is noted that the updated heater set points for the heating elements within a predetermined range of contiguity of the lateral edges of the film 26 are determined based upon the thickness of the extrudate at a predetermined one of the inner lanes. For example, the temperature set points 72A, 72B, 72C respectively developed for the heat responsive elements associated with the lanes 32A, 32B and 32C may be based upon the thickness of the extrudate monitored for the lane 32D. Similarly, the temperature set points for the heaters associated with the lanes 32N, 32(N−1) and 32(N−2) are derived from the thickness of the extrudate monitored in the lane 32(N−3). As a result the control of the thickness of the extrudate in the lanes contiguous to the lateral edges of the film 26 is improved, thereby reducing the wastage present in the edge portions 27 of the film. It is noted that temperature control (once a temperature set point is derived) loop is the same for all heaters. But the temperature set point for the laterally outer lanes is derived from the thickness of the extrudate in a predetermined inner lane.

Figure 8A:
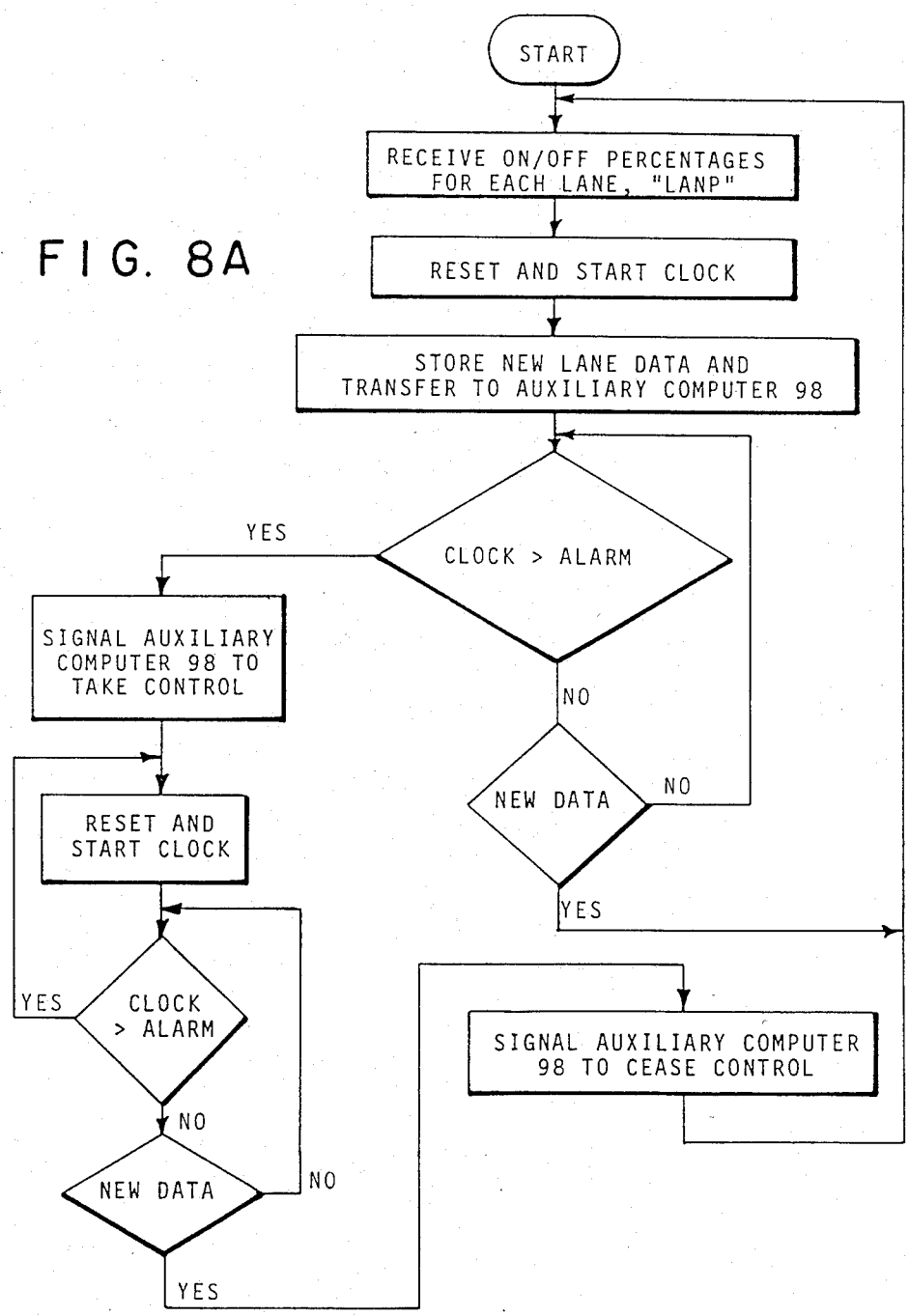
FIGS. 8A, 8B, 9 and 10 are, respectively, a flow diagram for the primary microcomputer program, a flow diagram for the program that generates a historical trend of previous heater duty cycle control signals, and a flow diagram for the auxiliary microcomputer heater control program.
Figure 8B:
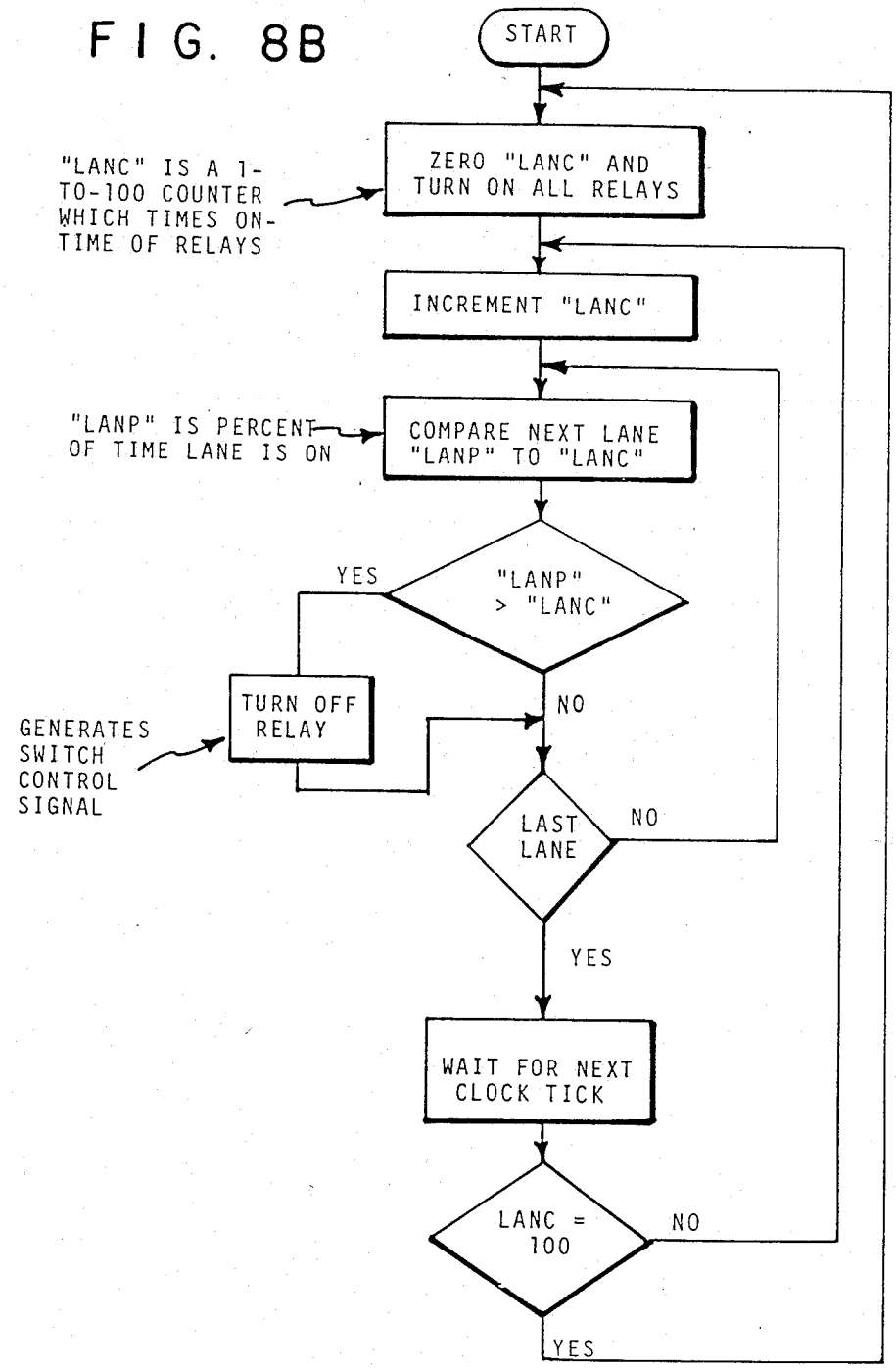

Once the appropriate heater duty cycle for each heat responsive element is applied to the controller 94 for that element the actual control of the heater is implemented by the primary microcomputer 96 over the line 105 connected through the switch 140. The microcomputer 96 controls each of the heaters 40 by regulating the duty cycle of the relays 44 which closes the circuit including that heating element for a predetermined duration of a predetermined time window. For example, a typical time window has a duration of 1.666 seconds. Using conventional power control circuitry this window affords one hundred opportunities at which current to the heater 40 may be interdicted. Thus, by controlling the point at which the power to the heater 40 is interrupted by opening of the relay 44, the duty cycle of the heater 40 is controlled. The primary microcomputer 96 also performs a "watch dog" function (shown in FIG. 8A) in that it monitors the data line 100 from the host 96 to verify that the host is transmitting data to the primary microcomputer 96. The heater control program executed by the primary microcomputer 100 is set forth in FIG. 8B.

Figure 9:
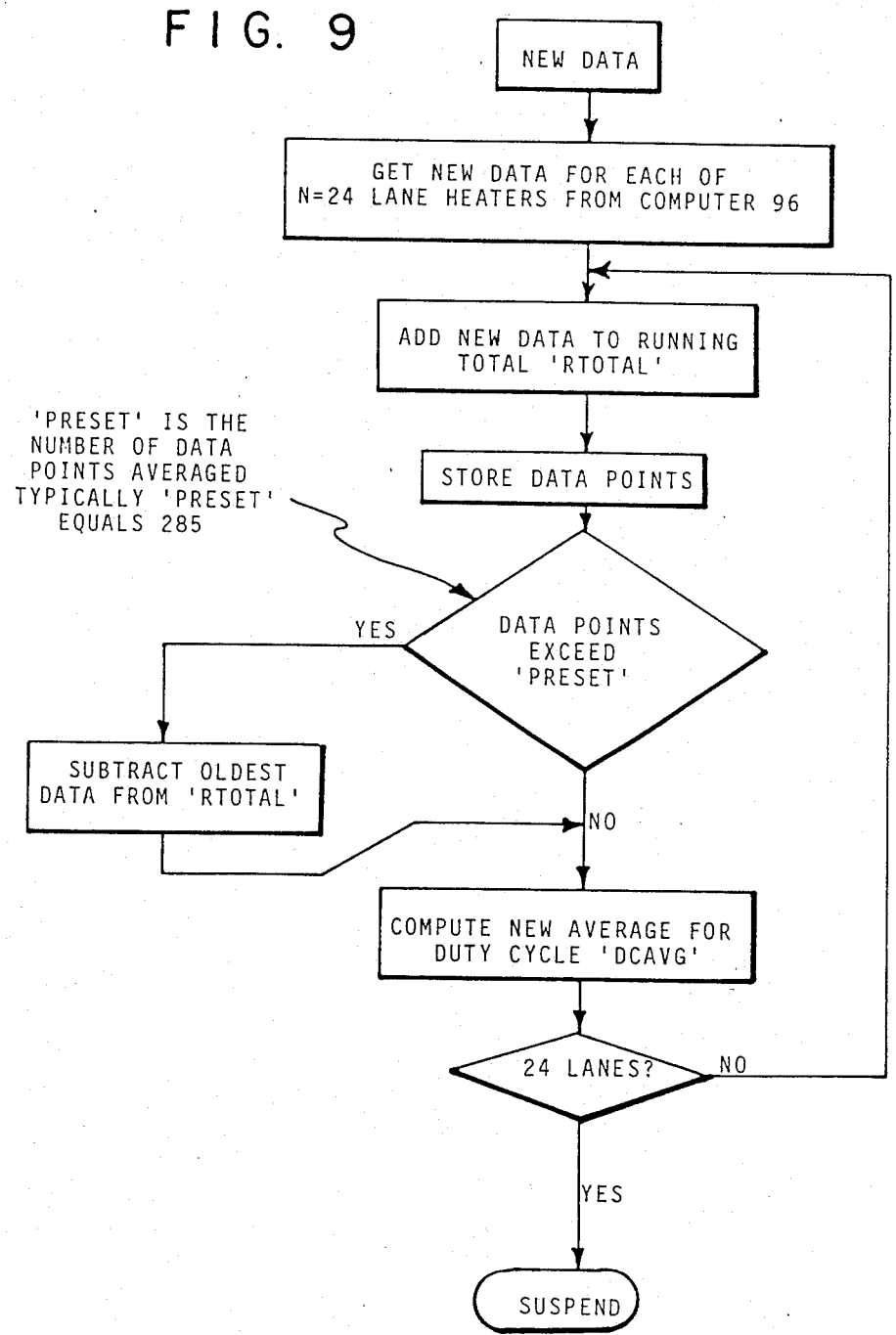

In addition, the primary microcomputer 96 is associated with the auxiliary microcomputer 98. The auxiliary microcomputer 98 serves to generate and to store a continuously updated duty cycle control signal for each heater based upon a predetermined number of preceding duty cycle values. In the event of the loss of host control (as evidenced by the failure of the primary microcomputer 96 to receive data over the link 100) the switch 104 switches and a duty cycle set point based upon the stored historical trend of duty cycle values is applied over the line 106 from the auxiliary microcomputer 98 to the line 58 and this signal is used to control the heat responsive elements. Each time data is passed from the host computer 92 (every seven sesconds) the data in turn is passed over the link 101 to the auxiliary computer 98. These data are averaged over a predetermined time, approximately a two hundred eighty five samples which covers the period of about forty-five minutes for each lane. This time is arbitrarily selected to provide a reasonable history of the duty cycle trend. Before all of the predetermined number of samples are achieved the data is added and a new average is calculated. After the predetermined number of samples the newest data is added and the oldest data are removed from the total such that the results is the average of only the latest predetermined number of samples. The program for this function of the auxiliary microcomputer 98 is shown in FIG. 9.

Figure 10:
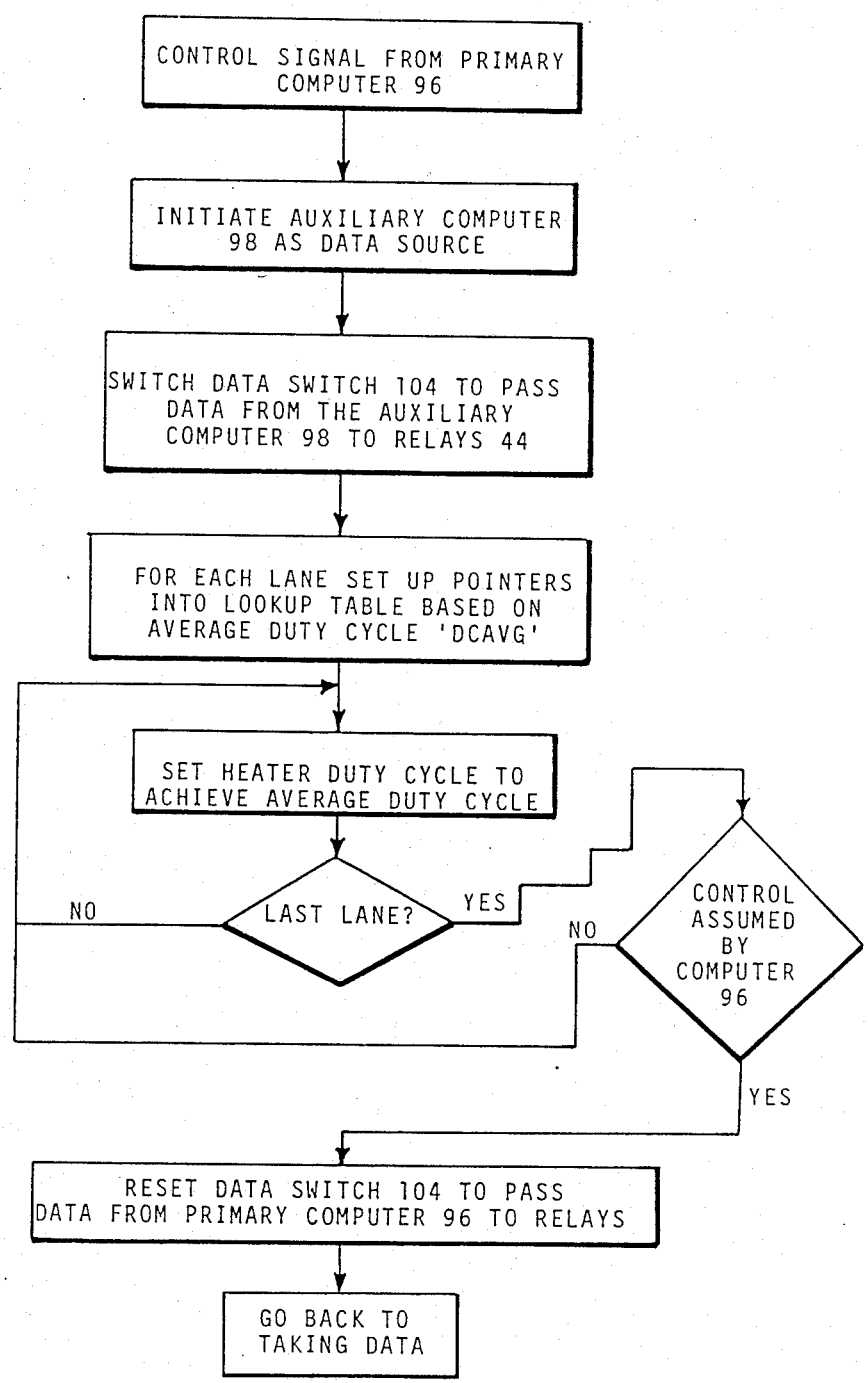

As seen from the program illustrated in flow diagram form in FIG. 10 at the time the primary microcomputer 96 determines by way of its "watch-dog" function that data are no longer being provided by the host computer 92 a control signal is passed over the line 102 to the auxiliary microcomputer 98 to take over the control function based on the previously computed and stored historical trend of the duty cycle. The auxiliary microcomputer executes a routine which permits the duty cycle of the heaters to approximate as closely as possible the historical duty cycle value. The limitation imposed by the existence of discrete switching points may render impractical a duty cycle value somewhere intermediate discrete points. So, the auxiliary microcomputer operates the heaters in such a manner that after a predetermined number of time windows has elapsed, the weighted sum of the duty cycles imposed during each window results in a duty cycle much closer to the accumulated duty cycle value. As a result when the host operability is restored the correction to the duty cycle set point needed to compensate for the period of host inoperability is minimized. This function of the auxiliary microcomputer 98 is shown in FIG. 10.

Two periods of different lengths are used by the auxiliary microcomputer 98 to control the average temperature of the die bolts. The first period, referred to as division one, consists of one hundred cycles of the sixty cycle line frequency. The second, referred to as divisions two, consists of one hundred cycles of division one. Division one lasts 1.666 seconds and division two lasts for (100×1.666) or 2.78 minutes. This time is selected as a compromise between the ability to achieve good resolution, one part in ten thousand, and the thermal time constant of the die bolts which is approximately fifteen minutes. The percentage time of each division is determined as in the following example.

EXAMPLE

Duty cycle average to be duplicated - DCAVG=55.35%

| | | |
|---|---|---|
| Division 2 | 65% | 35% |
| Division 1 (ON/OFF) | 55/45 | 56/44 |

Further, if division two percentages were even (divisible by two), then they would be reduced to the next smallest fraction. For instance, if the percentage of time that the 55/45 ratio to be held was 64 instead of 65 then the percentages would be changed to 32% for the 55/45 ratio and 16% for the 56/44 ratio which would be an equivalent average time but has the advantage of less temperature "ripple".

At the time the auxiliary duty cycle control computer is signaled that it must provide the control, a table is set up for each lane based on the averages that must be maintained. Once the table has been established, address pointers into the table are used by the computer to determine the on-off control sequence for the solid state relay for each heater.

The Appendix, which forms a part of this specification, contains listings of the programs described in the FIGS. 6 and 7. The programs are set forth in the fortran language and are keyed to the functional or computational blocks indicated in those FIGS.

Those skilled in the art, having the benefit of the teachings of the present invention as set forth herein may effect numerous modifications thereto. Such modifications are to be construed to be lying within the scope of the present invention as defined by the appended claims.

APPENDIX

LISTINGS

0001  :RP,LFE

0002  :RP,FILMC

0003  :RP,TSET

0004  :RP,PARDM

```
0001  FTN4,L
0002  C
0003
0004        PROGRAM LFE
0005  C
0006  C  ****************************************************
0007  C  *
0008  C  *   Program gets serial data from the LFE and transfers it
0009  C  *   to the main program using using class calls.  The class
0010  C  *   is obtained by the main program and passes it to this
0011  C  *   program when it initially schedules this program.
0012  C  *
0013  C  *   The data from the LFE is in the following format:
0014  C  *
0015  C  *      43B 4=xxx.xxx0əə əə əə ---------------əə4*
0016  C  *
0017  C  *   where xxx.xxx is ASCII representing the average
0018  C  *   thickness,əə are two 7 bit data fields:
0019  C  *
0020  C  *   100aaaa 100bbbb where aaaabbbb are a 8 bit twos
0021  C  *   compliment number representing the + and - deviation
0022  C  *   from the average.
0023  C  *
0024  C  *   The data is transferred in floating point format
0025  C  *   with the first word representing the average and
0026  C  *   the remaining words (~96) representing the deviation
0027  C  *   from the average.
0028  C  *
0029  C  *
0030  C  ****************************************************
0031  C
0032        INTEGER ICLAS,LU,IDUM1,IDUM2,IDUM3,IDUM4,ICNWD,LEN,IB,IA
0033        INTEGER IOP1,IOP2,PARM(5),BUFFER(300),CNWD,DATLEN,IBUF(300)
0034        INTEGER STBUF(300),INAM(3)
0035        INTEGER TEMP,TEMP1,IDATA,SIGN,IX,SCANFL
0036        REAL DATA(300),X,CALFAC,DIES
0037        EQUIVALENCE(DATA,IBUF)
0038        DATA INAM/2HDS,2HTO,2HR /
0039        ICNWD=26                    !SERIAL CARD LU
0040
0041        ICTR=1
0042        CNWD=100B
0043        IOP1=0                      !INDICATES BINARY DATA
0044        IOP2=0
0045        SCANFL=1
```

```
0046  C
0047  C    GET CLASS NUMBER (ICLAS) FROM CALLING PROGRAM
0048
0049  C
0050         CALL RMPAR(PARM)
0051         ICLAS=PARM(1)
0052  C
0053  C    GET DATA FROM LFE DEVICE THROUGH SERIAL CARD (LU 13)
0054  C
0055         WRITE(1,11)
0056   11    FORMAT("ENTER VALUE FOR DIES")
0057         READ(1,12)DIES
0058   12    FORMAT(F3.2)
0059         CALFAC=DIES/128
0060         WRITE(1,10)
0061  C
0062   10    FORMAT("ENTER NUMBER OF CHARACTERS TO CAPTURE")
0063         READ(1,20)LEN
0064         IF (LEN.LT.0) GOTO 400
0065   20    FORMAT(I3)
0066    5    LEN=-LEN
0067         CALL EXEC(1,ICNWD,BUFFER,LEN)
0068  C
0069         LEN=ABS(LEN)
0070         IF (SCANFL.EQ.0)THEN
0071           SCANFL=1
0072           GOTO 5
0073         ELSE
0074           SCANFL=0
0075         ENDIF
0076  C
0077  C    UNPACK DATA
0078  C
0079         DO 100 K=1,LEN
0080            TEMP=BUFFER(K)
0081            TEMP1=TEMP/256
0082            TEMP=IAND(TEMP,377B)
0083            I=2*K-1
0084            STBUF(I) =TEMP1
0085            STBUF(I+1)=TEMP
0086   100   CONTINUE
0087  C
0088  C    CONVERT DATA TO BINARY FORMAT
0089  C
0090  C    CONVERT ASCII AVERAGE TO REAL NUMBER
0091  C
0092  C    FIND DECIMAL POINT
0093  C
0094         KCTR=0
0095         DO 30 K=1,20
0096            KCTR=KCTR+1
0097            IF (STBUF(K).EQ.56B)THEN
0098               ISP=KCTR-1                   !SET STARTING POINT
0099               GOTO 31
0100            ELSE
0101               IF(KCTR.EQ.20)THEN
0102                  WRITE(1,32)(STBUF(KK),KK=1,20)
0103   32             FORMAT("DATA OUT OF RANGE",20A2)
0104                  SCANFL=1
0105                  GOTO 5
0106               ENDIF
0107            ENDIF
0108   30    CONTINUE
0109  C    NOW CONVERT
0110  C
0111   31    IX=STBUF(ISP)-60B
0112         X=FLOAT(IX)
0113         DATA(1)=X
0114         IF (DATA(1).LT.0) THEN
0115            DATA(1)=0
```

```
0116            ENDIF
0117            IX=STBUF(ISP+2)-60B
0118            X=FLOAT(IX)
0119            DATA(1)=X/10+DATA(1)
0120            IX=STBUF(ISP+3)-60B
0121            X=FLOAT(IX)
0122            DATA(1)=DATA(1)+X/100
0123            IX=STBUF(ISP+4)-60B
0124            X=FLOAT(IX)
0125            DATA(1)=DATA(1)+X/1000
0126   C
0127   C    TEST FOR OUT OF RANGE
0128   C
0129            IF(DATA(1).LE.0.OR.DATA(1).GT.10)THEN
0130               WRITE(1,33)DATA(1)
0131       33      FORMAT("LAST DATA FOR LFE WAS OUT OF LIMITS - AVG= ",F6.3)
0132               WRITE(1,35)(STBUF(KK),KK=1,10)
0133               WRITE(1,34)(BUFFER(KK),KK=1,5)
0134       34      FORMAT("BUFFER=",5A2)
0135       35      FORMAT("STBUF=",10A2)
0136               SCANFL=1
0137               GOTO 5
0138            ENDIF
0139   C
0140   C    ASSEMBLE PROFILE DATA FROM CODED FORMAT
0141   C
0142            I=2
0143            DO 500 K=ISP+6,LEN,2
0144               TEMP=STBUF(K)
0145               TEMP=TEMP*16              !MOVE 4 BITS LEFT
0146               TEMP1=IAND(STBUF(K+1),17B) !MASK NEXT WORD FOR RIGHT 4 BITS
0147               IDATA=IAND(TEMP+TEMP1,377B) !ADD AND MASK OUT HI BYTE
0148               SIGN=IAND(IDATA,200B)     !TEST BIT 9 FOR SIGN
0149               IF (SIGN.NE.0) THEN
0150                  IDATA=IDATA+177400B    !IF LO BYTE (-) MAKE WORD (-)
0151               ENDIF
0152               DATA(I)=FLOAT(IDATA)
0153               DATA(I)=DATA(I)*CALFAC
0154               I=I+1
0155       500  CONTINUE
0156            DATLEN=(I-1)
0157   C    TRANSFER DATA TO MAIN PROGRAM
0158   C
0159   C
0160            DATLEN=DATLEN*2
0161            CALL EXEC(20,0,IBUF,DATLEN,IOP1,IOP2,ICLAS)
0162            ICTR=ICTR+1
0163            WRITE(1,333)ICTR,(STBUF(KK),KK=1,10)
0164            WRITE(1,334)ICTR,(BUFFER(KK),KK=1,5)
0165       333  FORMAT("LFE TRANSFER ",I5,2X,10A2)
0166       334  FORMAT("LFE TRANSFER ",I5,2X,5A2)
0167   C
0168   C    CALL PROGRAM TO STORE DATA
0169   C
0170            CALL EXEC(10,INAM,IDUM1,IDUM2,IDUM3,IDUM4,IDUM5,IBUF,DATLEN)
0171            GOTO 5
0172       400 END

LODA

0001   SN,SNAP::-16
0002   LCOM
0003   SCOM
0004   LIB,$F4XLB
0005   LIB,$HPIB
0006   OUTPUT,FILMC::-17
```

```
0007  -SZ,25
0008  REL,%FILMC
0009  REL,%TSCN1
0010  REL,%TSCN2
0011  REL,%TSCN3
0012  REL,%TSCN4
0013  REL,%TSCN5
0014  REL,%BOLTP
0015  REL,%FLOOP
0016  REL,%THKLO
0017  REL,%GJR
0018  REL,%RDVAL
0019  REL,%DARED
0020  REL,%WRVAL
0021  END
0001  FTN4,L
0002  C
0003        PROGRAM FILMC
0004  C
0005  C ***********************************************************
0006  C *
0007  C *  This is the main program for control of extrusion coating
0008  C *  using a 24 lane EDI flexible lip die. This program is
0009  C *  scheduled periodically by the computer operating system with
0010  C *  a period (usually 50 milliseconds) determined interactively
0011  C *  by the operator. Each time the program is scheduled it
0012  C *  performs different measurement and control tasks by calling
0013  C *  other program modules. The value of BCLOK which ranges
0014  C *  between 0 and 78 determines what tasks are to be called.
0015  C *
0016  C *  The first time FILMC is scheduled it in turn schedules the
0017  C *  program HP16. HP16 acquires and decodes the thickness data
0018  C *  for the HP16 gage and places the results in a system buffer
0019  C *  for use by the FILMC program.
0020  C *
0021  C *  When BCLOK is 1 to 27 subprograms TSCA1, TSCA2, TSCA3, TSCA4
0022  C *  and TSCA5 are called to acquire and calculate 24 different
0023  C *  temperatures from the 24 die bolts.
0024  C *
0025  C *  When BCLOK is 28 to 51 the subprogram FLOOP is called to
0026  C *  to update the temperature loop model and calculate the on
0027  C *  time for the heaters.
0028  C *
0029  C *  When BCLOK is 52 the subprogram DARED is called to retrieve
0030  C *  the thickness data from system storage and calculate the 24
```

```
0031  C *   lane thicknesses.
      *
0032  C *
      *
0033  C *   When BCLOK is 53 to 77 the subprogram THKLP updates the
      *
0034  C *   system model and calculates new temperature set points.
      *
0035  C *
      *
0036  C *   When BCLOK is 78 it is reset to 0 and BOLTP is called to
      *
0037  C *   to output data to the microcomputer for new time heater
      *
0038  C *   time proportioned heater outputs.
      *
0039  C *
      *
0040  C *
      *
0041  C *
      *
0042  C ****************************************************************
      *
0043  C
0044        COMMON REFSIG,PLTTEM,CTR,DCPON,SCANNO,IFLFL,MODE
0045        COMMON         G(24),U(24),THDIFT,PAR1,ADAPT,LANEST
0046        DIMENSION TK(24,2),TG(24,2),DC(24,24),A(24,3,3),C(24,3)
0047        INTEGER BCLOK,CCLOK,CTR,FIRPA,FIRSC,DATRDY,REFSIG,RESET,DCPON
0048        INTEGER ICLAS,IA,IB,LENBUF,INAME(3),CLASS,CNWD,IBUF(300)
0049        INTEGER TPCNT,DBPON,K,BUFR(24),SCANFL,ITIME(5),TIMDIF
0050        REAL BUFF(150)
0051        EQUIVALENCE(BUFF,IBUF)
0052        EXTERNAL TPCNT
0053        DATA INAME/'HP16   '/
0054  C
0055  C    SCHEDULE BOLT PROPORTIONER EACH 77 TRIPS THROUGH THIS ROUTINE
0056  C
0057  C
0058        ICOMP=7400B+15B
0059  C
0060  C    SET PRINTER ON 6 TO 132 COLUMNS
0061        WRITE(6,897)ICOMP
0062  897   FORMAT(2A)
0063  C
0064        BCLOK=0
0065        CLASS=0
0066        SCANNO=0
0067        IFLAG=0
0068        CNWD=100B
0069        LENBUF=300
0070        SCANFL=0
0071        IFLAG=0
0072        CTR=0
0073        WRITE(1,92)
0074  92    FORMAT(' CONTROL MODE:   TEMP ONLY (0) OR THICK CASCADE (1)?')
0075        READ(1,98)MODE
0076  98    FORMAT(I1)
0077        IF(MODE .EQ. 0)GOTO 20
0078        WRITE(1,101)
0079  101   FORMAT(' DECOUPLER ON (1) OR OFF (2)?')
0080        READ(1,102)DCPON
0081  102   FORMAT(I1)
0082        WRITE(1,103)
0083  103   FORMAT(' ADAPTIVE THICKNESS CONTROLLER ON (1) OR OFF (2)?')
0084        READ(1,102)ADAPT
0085        WRITE(1,143)
```

```
0086  143   FORMAT(' NO. OF LANES ON EACH SIDE NOT IN CONTROL (Default=3
)?')
0087        READ(1,102)LANEST
0088        IF(LANEST .LT. 1 .OR. LANEST .GT. 3)LANEST=3
0089   20   WRITE(1,110)
0090  110   FORMAT("ENTER STANDBY POWER (%) FOR DIE BOLT HEATERS")
0091  140   READ (1,120)DBPON
0092  120   FORMAT(I3)
0093        IF (DBPON.LE.0) THEN
0094           GOTO 5
0095        ELSE
0096           IF (DBPON.GT.99) THEN
0097              GOTO 20
0098           ELSE
0099              DO 40 K=1,24
0100              BUFR(K)=DBPON+256*K
0101   40         CONTINUE
0102              CALL WRVAL(TPCNT,BUFR)
0103              CALL BOLTP
0104           ENDIF
0105        ENDIF
0106        WRITE (1,130)DBPON
0107  130   FORMAT("OPERATING AT ",I2,"%. PRESS CR TO CONT OR ENTER NEW
%")
0108        GOTO 140
0109  C
0110  C    GET CLASS NUMBER
0111  C
0112    5   CALL EXEC(20,CNWD,IBUF,LENBUF,IDUM3,IDUM4,CLASS)
0113  C
0114  C    CONSUME CLASS NUMBER
0115  C
0116        CALL EXEC(21,CLASS+120000B,IBUF,LENBUF)
0117        ICLAS=CLASS+120000B !SET NO WAIT BIT AND SAVE CLASS NUMBER B
IT
0118  C
0119  C    SCHEDULE HP16 DATA ACQUISITION PROGRAM AND PASS CLASS NUMBER
0120  C
0121        CALL EXEC(10,INAME,CLASS)
0122  C
0123  C
0124  C    BEGINNING OF CONTROL OPERATION
0125  C
0126  C
0127   10   CONTINUE
0128  C
0129  C    GET AND PRINT OUT TIME
0130  C
0131  C    UPDATE BCLOK
0132  C
0133        IF(BCLOK .GT. 77) THEN
0134           BCLOK=0
0135        ELSE
0136           BCLOK=BCLOK+1
0137        ENDIF
0138        IF(BCLOK .EQ. 0) THEN
0139           CALL BOLTP
0140        ENDIF
0141  C
0142  C
0143  C    SCHEDULE TEMPERATURE SCAN 1 TIME TO GET REFERENCE CALIBRATI
ON
0144  C
0145        IF (BCLOK.EQ.1) THEN
0146           CALL TSCA1
0147           ENDIF
0148  C
0149  C    SCHEDULE TEMPERATURE SCAN 1 TIME TO GET REFERENCE TEMPERATURE
0150  C
```

```
0151            IF (BCLOK.EQ.2) THEN
0152               CALL TSCA2
0153            ENDIF
0154   C
0155   C   SCHEDULE SUBROUTINE TO COMPUTE REFERENCE TEMPERATURE
0156   C   AND INITIATE THE FIRST TEMPERATURE MEASUREMENT
0157   C
0158            IF (BCLOK.EQ.3) THEN
0159               CALL TSCA3
0160               CALL TSCA4
0161            ENDIF
0162   C
0163            IF (BCLOK.GE.4) THEN
0164               IF (BCLOK.LE.26) THEN
0165                  CALL TSCA5
0166                  CALL TSCA4
0167               ELSE
0168                  IF (BCLOK.EQ.27) THEN
0169                     CALL TSCA5
0170                     CTR=0
0171                  ENDIF
0172               ENDIF
0173            ENDIF
0174   C   SCHEDULE TEMPERATURE CONTROL LOOP 24 TIMES EACH OUT OF 77 TRIP
S
0175   C   THROUGH THIS ROUTINE
0176            IF(BCLOK .GE. 28)THEN
0177               IF(BCLOK .LE. 51)THEN
0178               CCLOK=BCLOK-27
0179               CALL FLOOP(CCLOK,TK,TG,A,C)
0180               ENDIF
0181            ENDIF
0182   C
0183   C   GET THICKNESS MEASUREMENTS FROM LFE AND IF THERE IS DATA THEN
0184   C   SCHEDULE DARED THICKNESS DATA REDUCTION PROGRAM
0185   C
0186            IF(MODE .EQ. 0)GOTO 703
0187            IF (BCLOK.EQ.52)THEN
0188               CALL EXEC(21,ICLAS,IBUF,LENBUF)
0189               CALL ABREG(IA,IB)
0190               IF(IA.GE.0)THEN
0191                  IF(BUFF(1) .LE. 0)GOTO 703
0192                  CALL DARED(BUFF)
0193               ENDIF
0194            ENDIF
0195            IF (BCLOK.GE.53.AND.BCLOK.LE.77)THEN
0196               IF(BUFF(1) .LE. 0)GOTO 703
0197               IF(IA.GE.0)THEN
0198                  LANE=BCLOK-52
0199                  CALL THKLO(LANE,TK,TG,DC)
0200               ENDIF
0201            ENDIF
0202   C
0203   C   SUSPEND
0204   C
0205   703      CONTINUE
0206   C
0207            CALL EXEC(6,0,1)
0208            GOTO 10
0209            END
0001   FTN4,L
0002            SUBROUTINE TSCA1
0003   C
0004   C   ***************************************************************
0005   C   *
0006   C   *   Five subprograms are called by FILMC to get temperature
```

```
0007  C    *    data from the CPI interface. This subprogram initiates
  *
0008  C    *    the acquisition of the calibratation voltage across
  *
0009  C    *    a precision resistor. This voltage is used to
  *
0010  C    *    calibrate the RTD output once at the beginning of the
  *
0011  C    *    the acquisition of the 24 temperature measurements.
  *
0012  C    *
  *
0013  C    *    The command format control word REFBU1 selects card
  *
0014  C    *    slot 3, enables interrupt, and selects random access
  *
0015  C    *    mode.  The data output format control word REFBU2
  *
0016  C    *    sets the channel to 0 on the first gate card, and the
  *
0017  C    *    full scale output to 102.4 mv. The data is acquired
  *
0018  C    *    on the next cycle of FILMC by subprogram TSCA2.
  *
0019  C    *
  *
0020  C    ***********************************************************
**
0021  C
0022       INTEGER REFBU1,REFBU2
0023  C    SLOT3=3
0024  C    GAIN=3
0025  C    REFBU1=9*256+SLOT3
0026       REFBU1=2307
0027  C    REFBU2=GAIN-1
0028       REFBU2=2
0029  C
0030  C  Select card 3, enable interrupt, and select random access mode
0031  C
0032       CALL SECW(8,0,REFBU1,1)
0033  C
0034  C  Set gain to 102.4 millivolts on channel 0 of first gate card
0035  C
0036       CALL SECW(9,0,REFBU2,1)
0037       RETURN
0038       END
0039
0001  FTN4,L
0002       SUBROUTINE TSCA2
0003  C
0004  C    ***********************************************************
**
0005  C    *
  *
0006  C    *    Five subprograms are called by FILMC to get temperature
  *
0007  C    *    data from the CPI interface.  This subprogram acquires
  *
0008  C    *    the data for the calibration voltage initiated by
  *
0009  C    *    the subprogram TSCA1 and initiates the acquisition of
  *
0010  C    *    the temperature reference from the RTD.
  *
0011  C    *
  *
0012  C    *    The command format control word CTLWD selects card
  *              CN
0013  C    *    slot 3, disables interrupt, and selects random access
  *
```

```
0014  C     *    mode. The data acquired from the card is placed in
0015  C     *    buffer word REFSIG. The card is set up for the next
0016  C     *    measurement by the command format control word REFBU1
0017  C     *    which selects card slot 3, enables interrupt, and
0018  C     *    selects random access. The data output format for the
0019  C     *    RTD temperature measurement is set up by the word
0020  C     *    RESBU1 which selects channel 1 on the first gate card
0021  C     *    and the full scale output to 102.4 millivolts. The data
0022  C     *    is acquired for the reference temperature by subprogram
0023  C     *    TSCA3.
0024  C     *
0025  C     ****************************************************************
0026
0027  C
0028        INTEGER REFSIG,REFBU1,RESBU1,CTLWD,CTR
0029        COMMON REFSIG,PLTTEM,CTR
0030  C     REFBU1=9*256+SLOT3
0031        REFBU1=2307
0032  C     RESBU1=16+GAIN-1
0033        RESBU1=18
0034  C     REFBU1=256*5+3
0035        CTLWD=1283
0036  C
0037  C  Select card address 3, disable interrupt, select random access mode
0038  C
0039        CALL SECW(8,0,CTLWD,1)
0040  C
0041  C  Get data and store in REFSIG
0042  C
0043        CALL SECR(9,0,REFSIG,1)
0044  C
0045  C  Select card address 3, enable interrupt, select random access mode
0046  C
0047        CALL SECW(8,0,REFBU1,1)
0048  C
0049  C  Select channel 1 and set gain to 102.4 mv fullscale
0050  C
0051        CALL SECW(9,0,RESBU1,1)
0052        RETURN
0053        END
0001  FTN4,L
0002        SUBROUTINE TSCA3
0003  C
0004  C     ******************************************************************
0005  C     *
0006  C     *    This subroutine acquires the data for the RTD reference
0007  C     *    temperature and using the calibration data acquired by
0008  C     *    subprogram TSCA2 calculates the reference temperature for
0009  C     *    use in calculating the temperature in degrees Celsius of
0010  C     *    of the 24 thermal expansion bolts.
```

```
0011  C   *
0012  C   *    The RTD measurement is stored in RESSIG and the
0013  C   *    calculated value for reference temperature is stored in
0014  C   *    PLTTEM.
0015  C   *
0016  C   ****************************************************************
0017
0018         COMMON REFSIG,PLTTEM
0019         INTEGER RESSIG,REFSIG,CTLWD
0020         DATA RA,RC/121.79,100.12/
0021  C
0022  C      RK=5500./(RA-RC)
0023         RK=253.81
0024  C      RD=RC/100.
0025         RD=1.0012
0026  C      CTLWD=256*5+3
0027         CTLWD=1283
0028  C
0029  C   Select card address 3 and turn off interrupt
0030  C
0031  C   Get data and store it in RESSIG
0032  C
0033         CALL SECW(8,0,CTLWD,1)
0034         CALL SECR(9,0,RESSIG,1)
0035         RRSSIG=RESSIG
0036         RRFSIG=REFSIG
0037         PLTTEM=RK*(RRSSIG/RRFSIG-RD)
0038         RETURN
0039         END
0001  FTN4,L
0002         SUBROUTINE TSCA4
0003  C
0004  C   ****************************************************************
0005  C   *
0006  C   *    Five subprograms are called by FILMC to get temperature
0007  C   *    data from the CPI interface.  This subprogram initiates
0008  C   *    the scan of each thermocouple.  If thermocouples 1 thru
0009  C   *    6 are being scanned card address 3 and channels 2 thru
0010  C   *    7 of gate card 0 are selected.  If thermocouples 7 thru
0011  C   *    14 are being scanned card address 3 and channels 0 thru
0012  C   *    7 of gate card 1 are selected. If thermocouples 15
0013  C   *    thru 22 are scanned card address 6 and channels 0 thru
0014  C   *    7 of gate card 0 are selected. For thermocouples 23 and
0015  C   *    24 card address 6 and channels 0 and 1 of gate card 1
0016  C   *    are selected.
0017  C   *
0018  C   *    The thermocouple data set up by this subroutine are
0019  C   *    read by subroutine TSCA5.
```

```
0020  C     *
0021  C     ***************************************************
0022  C
0023  C
0024        COMMON REFSIG,PLTTEM,CTR
0025        INTEGER TEMBU3,CCRD1,CCRD2,CTR,TEMBU1,TEMBU2,GAIN
0026        INTEGER CHAN,REFSIG
0027        DATA GAIN/3/
0028  C
0029  C        INITIALIZE
0030  C
0031  C     CCRD2=9*256+SLOT6
0032        CCRD2=2310
0033  C     CCRD1=9*256+SLOT3
0034        CCRD1=2307
0035  C     GET 24 TEMPERATURES
0036  C
0037        CTR=CTR+1              !CTR is set to 0 by FILMC program
0038        CHAN=CTR+1
0039        IF (CTR.GT.14)CHAN=CHAN-16
0040        TEMBU2=CHAN*16+GAIN
0041        IF (CTR .LE. 14) THEN
0042            TEMBU1=CCRD1
0043        ELSE
0044            TEMBU1=CCRD2
0045        ENDIF
0046  C
0047  C  Set up control word to get temperature
0048  C
0049        CALL SECW(8,0,TEMBU1,1)
0050  C
0051  C  Send control word to get temperature
0052  C
0053        CALL SECW(9,0,TEMBU2,1)
0054  C
0055        RETURN
0056        END
0001  FTN4,L
0002        SUBROUTINE TSCA5
0003  C
0004  C     ***************************************************
0005  C     *
0006  C     *   Five subprograms are called by FILMC to get temperature
0007  C     *   data from the CPI interface.  This subprogram reads the
0008  C     *   thermocouple output voltage, corrects for thermocouple
0009  C     *   nonlinearity and adds the reference offset voltage.
0010  C     *   The resulting temperature measurement is stored in the
0011  C     *   data base under TPCUR by calling the WRVAL subprogram.
0012  C     *
0013  C     ***************************************************
0014  C
0015        EXTERNAL TPCUR
0016        COMMON REFSIG,PLTTEM,CTR
0017        DIMENSION C(4)
0018        REAL TEMPER,TEMBUF,PLTTEM,SCALE
0019        INTEGER TEMBU3,CARD1,CARD2,CTR,IDATA,REFSIG
0020        DATA C(1),C(2),C(3)/1.9323799E-2,-1.0306020E-7,3.7084018E-12
```

```
0021            DATA C(4)/-5.1031937E-17/
0022    C
0023    C    Initilize
0024    C
0025            SCALE=5
0026    C
0027    C       CARD2=5*256+SLOT6
0028            CARD2=1286
0029    C       CARD1=5*256+SLOT3
0030            CARD1=1283
0031    C    Get 24 Temperatures. The counter CTR is setup by the subprogram TSCA4
0032    C    which initiates the temperature measurement.
0033    C
0034            IF (CTR .LE. 14) THEN
0035                TEMBU3=CARD1
0036            ELSE
0037                TEMBU3=CARD2
0038            ENDIF
0039    C
0040    C    Get thermocouple output stored in 11 bits which = 10.24 full scale
0041    C    The gate card and channel were previously set up by subprogram TSCA4
0042    C    which set the card up for a measurement on the previous cycle
0043    C
0044            CALL SECW(8,0,TEMBU3,1)
0045            CALL SECR(9,0,IDATA,1)
0046            TEMBUF=IDATA
0047    C
0048    C    Compute Temperature
0049    C
0050            TEMBUF=TEMBUF*SCALE
0051            TEMPER=TEMBUF*(C(1)+TEMBUF*(C(2)+TEMBUF*(C(3)+TEMBUF*C(4))))
0052            TEMPER=TEMPER+ PLTTEM
0053    C
0054    C    Store Temperature
0055    C
0056            IF(CTR .LT. 1)GOTO 101
0057            IF(CTR .GT. 24)GOTO 101
0058    C
0059    C        CHECK FOR TEMPERATURE FLYERS!!!
0060    C
0061            CALL RDVAL(TPCUR,TLAST,CTR)
0062            IF(TLAST .LE. 25)GOTO 123
0063            IF(ABS(TLAST-TEMPER) .GE. 10.)TEMPER=TLAST
0064        123 CONTINUE
0065            CALL WRVAL(TPCUR,TEMPER,CTR)
0066        101 RETURN
0067            END
0001    FTN4,L
0002            SUBROUTINE BOLTP
0003    C
0004    C    ****************************************************************
0005    C    *
0006    C    * Program to transfer percentage time on of the die bolt heaters *
0007    C    * to the microcomputer through the parallel interface card (PIC).*
0008    C    * This program is called by the FILMC program and retrieves data *
0009    C    * stored in the data base under TPCNT.
0010    C    *
0011    C    *
```

```
0012  C  *
      *
0013  C  ****************************************************************
****
0014  C
0015  C
0016        INTEGER BUFR(24), CNTWD, BUFLN, PRAM1, PARMS(5)
0017        INTEGER TPCNT
0018        EXTERNAL TPCNT
0019
0020
0021        PRAM1 = 0
0022        BUFLN = 24
0023
0024  C  Clear and reset PIC
0025        CNTWD = 40014B
0026        CALL EXEC(3, CNTWD, PRAM1)
0027
0028  C  Set DVP1 value (driver parameter #1)
0029        CNTWD = 44014B
0030        CALL EXEC(3, CNTWD, PRAM1)
0031
0032  C  Get percentage data from PIR
0033  C
0034        CALL RDVAL(TPCNT,BUFR)
0035  C
0036  C  Output data to parallel card
0037  C
0038        CNTWD = 40014B
0039        CALL EXEC(2, CNTWD, BUFR, BUFLN, PRAM1)
0040
0041
0042  C
0043  C       Get & report status of the card.
0044  C       CALL EXEC(3, 40614B, PRAM1)
0045  C
0046  C       CALL RMPAR(PARMS)
0047  C
0048
0001  FTN4,L
0002        SUBROUTINE FLOOP(J,TK)                              ——— 201
0003        COMMON REFSIG,PLTTEM,CTR,DCPON,SCANNO
0004        EXTERNAL TPER0,TPER1,TPER2,TPCUR,TPPRO,TPWND,TPACH,TPACL,TPS
ET,T
0005       1PCNT
0006        INTEGER TON,IKNT,CTR,REFSIG,DCPON,FIRPA,FIRSC,RESET,DATRDY
0007        DIMENSION OK(24,2),TK(24,2),X(24),P(24,25),S(24),A(24,3,3),C
(24,3)
0008        DIMENSION BIA(24)
0009        REAL KPT
0010        CALL RDVAL(TPER1,TER1,J)  ⎫
0011        CALL RDVAL(TPER2,TER2,J)  ⎪
0012        CALL RDVAL(TPCUR,TEMP,J)  ⎪
0013        CALL RDVAL(TPPRO,KPT,J)   ⎬ 202
0014        CALL RDVAL(TPWND,TPT,J)   ⎪
0015        CALL RDVAL(TPACH,TLAM,J)  ⎪
0016        CALL RDVAL(TPACL,TTDER,J) ⎪
0017        CALL RDVAL(TPSET,TSET,J)  ⎭
0018        TER=TSET-TEMP                                       ——— 74
0019        IF(KPT .LE. 0 .OR. TPT .LE. 0)THEN ⎫
0020          KPT=0.75                          ⎪
0021          TPT=900                           ⎬ 203
0022        ENDIF                               ⎪
0023        IF(KPT .GE. 10)KPT=10               ⎪
0024        IF(TPT .GE. 1500)TPT=1500           ⎭
0025        CALL RDVAL(TPCNT,TON,J)                             ——— 204
0026        TK(J,1) = TK(J,2)
0027        OK(J,1) = OK(J,2)
0028        TK(J,2) =TEMP
0029        OK(J,2) =TON
```

```
0030        IF(IFLFL .GT. 0)GOTO 600
0031        TK(J,1)=TK(J,2)
0032        OK(J,1)=OK(J,2)
0033        A(J,1,1)=TK(J,1)*TK(J,1)
0034        A(J,1,2)=TK(J,1)*OK(J,1)
0035        A(J,1,3)=TK(J,1)
0036        A(J,2,2)=OK(J,1)*OK(J,1)
0037        A(J,2,3)=OK(J,1)
0038        C(J,1)=A(J,1,1)
0039        C(J,2)=A(J,1,2)
0040        C(J,3)=A(J,1,3)
0041        IF(J .EQ. 24)IFLFL=1
0042   600 CONTINUE
0043        Q=0.1813
0044        R=1-Q
0045        A(J,1,3)=Q*TK(J,1)+R*A(J,1,3)
0046        A(J,1,1)=Q*TK(J,1)*TK(J,1)+R*A(J,1,1)
0047        A(J,1,2)=Q*TK(J,1)*OK(J,1)+R*A(J,1,2)
0048        A(J,2,1)=A(J,1,2)
0049        A(J,2,2)=Q*OK(J,1)*OK(J,1)+R*A(J,2,2)
0050        A(J,2,3)=Q*OK(J,1)+R*A(J,2,3)
0051        A(J,3,1)=A(J,1,3)
0052        A(J,3,2)=A(J,2,3)
0053        A(J,3,3)=1
0054        C(J,1)=Q*TK(J,2)*TK(J,1)+R*C(J,1)
0055        C(J,2)=Q*TK(J,2)*OK(J,1)+R*C(J,2)
0056        C(J,3)=Q*TK(J,2)+R*C(J,3)
0057        IF(J .EQ. 24)IFLFL=IFLFL+1
0058        TSAMP=30
0059        CON2=EXP(-TSAMP/TPT)
0060   703 PREDT=CON2*TK(J,1)+KPT*(1-CON2)*OK(J,2)+BIA(J)
0061 C      WRITE(1,967)J,TEMP,PREDT
0062   967 FORMAT(5X,'LANE ',I2,,' TEMP ',F6.2,' PREDT ',F6.2)
0063        IF(ABS(PREDT-TEMP) .LE. 0.3)GOTO 801
0064 C      DO 608 I=1,3
0065 C      WRITE(1,607)(A(J,I,L),L=1,3),C(J,I),IFLFL
0066 C 608 CONTINUE
0067   607 FORMAT(5X,4(F10.4,3X),I4)
0068        IF(IFLFL .LE. 5)GOTO 801
0069        DO 709 I=1,3
0070        DO 710 L=1,3
0071   710 P(I,L)=A(J,I,L)
0072   709 S(I)=C(J,I)
0073        CALL GJR(P,S,X,3,1,NRET)
0074        IF(NRET .EQ. 0)GOTO 801
0075 C      WRITE(1,607)(X(I),I=1,3),0,IFLFL
0076        IF(X(1) .LE. 0)GOTO 801
0077        TPT=-TSAMP/ALOG(X(1))
0078        BIA(J)=X(3)
0079        KPT=X(2)/(1-X(1))
0080   801 CONTINUE
0081        IF(KPT .LE. 0 .OR. TPT .LE. 0)THEN
0082          KPT=0.75
0083          TPT=900
0084        ENDIF
0085        IF(KPT .GE. 10)KPT=10
0086        IF(TPT .GE. 1500)TPT=1500
0087        IF(KPT .LE. 0.1)KPT=0.1
0088        CON1=EXP(-TSAMP/TLAM)
0089        CON2=EXP(-TSAMP/TPT)
0090        TX=TER
0091        IF(TX .GT. 10)TX=10
0092        IF(TX .LT. -10)TX=-10
0093        TON=OK(J,2)+(1-CON1)/(KPT*(1-CON2))*TER-(CON2-CON1*CON
0094       12)/(KPT*(1-CON2))*TER1+TTDER*TX
0095        IF(TON .GT.  99)TON=99
0096        IF(TON .LT. 0)TON=0
```

```
0097        800 CONTINUE
0098            CALL WRVAL(TPPRO,KPT,J)
0099            CALL WRVAL(TPWND,TPT,J)
0100            CALL WRVAL(TPCNT,TON,J)                } 211
0101            CALL WRVAL(TPERO,TER,J)
0102            CALL WRVAL(TPER1,TER,J)
0103            CALL WRVAL(TPER2,TER1,J)
0104            RETURN
0105            END                     ——— 212
0001    FTN4,L
0002          . PROGRAM DSTOR
0003    C
0004    C *********************************************************
0005    C *                                                         *
0006    C *  Program to receive data from the LFE program and store it *
0007    C *  on the disk. The program is called by the LFE program  *
0008    C *  which gets thickness data from the LFE gage.           *
0009    C *                                                         *
0010    C *    The data is stored in 'PROFIL' as follows:           *
0011    C *                                                         *
0012    C *       TIME - WORDS 1 TO 5                               *
0013    C *       LENGTH OF DATA - WORD 6                           *
0014    C *       DATA - STARTS AT WORD 7                           *
0015    C *                                                         *
0016    C *                                                         *
0017    C *                                                         *
0018    C *********************************************************
0019    C
0020    C
0021            INTEGER IDCB(272),IBUF(256),INAM(3),ISIZ(2),IBUFF(256)
0022            INTEGER ITIME(5),ILEN,IA,IB,IBUF2(128)
0023            EQUIVALENCE(ITIME,IBUF)
0024            EQUIVALENCE(IB,IBUF(6))
0025            EQUIVALENCE(IBUF(129),IBUF2)
0026            EQUIVALENCE(IBUFF,IBUF(7))
0027            DATA INAM/2HPR,2HOF,2HIL/
0028            DATA ISIZ/256,128/      !256 BLOCKS,128 WORD PER BLOCK
0029            ITYPE=2
0030            ILEN=256
0031            IOPTN=1                         !CAN BE CALLED FROM SEVERAL PROGRAMS
0032            ICR=-17                         !LU
0033            INUM=1                          !FILE RECORD NUMBER
0034    C
0035    C   PURGE FILE 'PROFIL' IF IT EXISTS
0036    C
0037            CALL PURGE(IDCB,IERR,INAM)
0038    C
0039    C   CREATE FILE 'PROFIL' ON CARTRIDGE 17
0040    C
0041            CALL CREAT(IDCB,IERR,INAM,ISIZ,ITYPE,O,ICR)
0042            IF(IERR.LT.0)THEN
0043              IFLAG=1
0044              GOTO 999
0045            ENDIF
0046    C
0047    C   CLOSE FILE
0048    C
0049            CALL CLOSE(IDCB)
0050
0051    C
0052    C   GET DATA AND STORE IN NEXT RECORD OF 'PROFIL'
0053    C
0054    10      CONTINUE
0055    C
0056    C   GET DATA FROM FATHER  -  ILEN IS THE LENGTH OF DATA BUFFER
0057    C
0058            CALL EXEC(14, BUFF,ILEN)
0059·
```

```
0060          CALL ABREG(IA,IB)
0061          IF(IA.EQ.1)GOTO 999           !IF IA=1 THEN NO DATA IS PRESENT
0062    C
0063    C   GET TIME; TIME(2)=SECS, TIME(3)=MINUTES, TIME(4)=HOURS
0064    C
0065          CALL EXEC(11,ITIME)
0066    C
0067    C   OPEN FILE
0068    C
0069          CALL OPEN(IDCB,IERR,INAM,IOPTN,0,ICR)
        C-
0070          IF(IERR.LT.0)THEN
0071             IFLAG=2
0072             GOTO 999
0073             ENDIF
0074    C
0075    C   WRITE NEXT RECORD (INUM IS RECORD NUMBER)
0076    C
0077          CALL WRITF(IDCB,IERR,IBUF,256,INUM)
0078          INUM=INUM+1                   !INCREMENT RECORD NUMBER
0079          IF(IERR.LT.0)THEN
0080             IFLAG=3
0081             GOTO 999
0082             ENDIF
0083          CALL WRITF(IDCB,IERR,IBUF2,128,INUM)
0084          INUM=INUM+1
0085    C
0086    C   CLOSE FILE
0087    C
0088          CALL CLOSE(IDCB)
0089          GOTO 20
0090    C
0091    C   ERROR HANDLER
0092    C
0093    999   WRITE(1,99)IFLAG,IERR
0094     99   FORMAT("FILE ACCESS ERROR AT LOCATION ",I2,"ERR CODE",I3)
0095    C
0096    C   SUSPEND
0097    C
0098     20   CALL EXEC(6,0,1)
0099    C
0100    C   GO BACK FOR MORE WHEN CALLED AGAIN
0101    C
0102          GOTO 10
0103          END
0001    FTN4,L
0002          SUBROUTINE THKLO(M,TK,TG,DC)        — 300
0003    C*********************************************************
0004    C**
0005    C**                    SUBROUTINE THKLO(M,TK,TG,DC)
0006    C**
0007    C**  This subroutine is the primary control program for the film
0008    C**  thickness loop.  It is called from the mainline program,
0009    C**  FILMY, once per lane each sample. Parameters passed are:
0010    C**
0011    C**                M --- The lane number:
0012    C**                          1 to 24 --- Actual bolt #
0013    C**                             25    --- Decoupler calculation
```

```
0014 C**                    TK  --- The matrix of temperature values
**
0015 C**                            of the bolts; from the 2 last scans.
**
0016 C**                    TG  --- The matrix of filtered temperatures.
0017 C**
**
0018 C**
**
0019 C** Control variable data, lane thickness, is passed into this
**
0020 C** program through the EXTERNAL buffers:
**
0021 C**
**
0022 C**               THCUR --- The matrix of most recent thicknesses
**
0023 C**               THSET --- The matrix of thickness setpoints
**
0024 C**               THPRO --- The matrix of controller gains
**
0025 C**               THDED --- The matrix of reset times
**
0026 C**               THWND --- The matrix of derivative times
**
0027 C**
**
0028 C** Sample time, TS,is also passed into program through COMMON.
**
0029 C** This program then calculates and stores the following buffers
:**
0030 C**.
**
0031 C**               THERO --- The matrix of current thickness error
**
0032 C**               THER1 --- The matrix of past sample errors
**
0033 C**               THER2 --- The matrix of errors 2 samples past
**
0034 C**               TPSET --- The matrix of calculated temp setpts
**
0035 C**
**
0036 C**
**
0037 C** The control strategy first checks to see if the process model
**
0038 C** for lane M adequately describes the actual process data.  If
**
0039 C** not, the program calls the identification routine which is a
**
0040 C** least squares estimator.  The estimator calculates the value
**
0041 C** of two parameters, the process gain relating thickness to
**
0042 C** bolt temperature and the lane interaction constant that
**
0043 C** describes the effect that a change in bolt temperature on lan
e**
0044 C** I has on thickness in lanes I+1 and I-1.  The parameters that
**
0045 C** are chosen are the values which minimize the squared error
**
0046 C** between model prediction and recent process data.
**
0047 C** The control algorithm for each lane is a discrete version of
**
0048 C** the velocity form of the PID controller.  Each time the
**
```

```
0049  C** program is called for M=1 to 24 the controller output, change
0050  C** in temperature setpoint, is calculated from the PID algorithm
0051  C** for that lane.  When the program is called and M=25, the
0052  C** decoupler is calculated by inverting the gain matrix.  The 24
0053  C** individual outputs are then modified by the decoupler to
0054  C** negate the effect of lane to lane interaction.  Then the
0055  C** updated values of controller output are placed in the EXTERNAL**
0056  C** buffer, TPSET, and program control is returned to FILMY.
0057  C**
0058  C**
0059  C**
0060  C**
0061  C**
0062  C**
0063  C**
0064  C********************************************************************
0065        COMMON REFSIG,PLTTEM,CTR,DCPON,SCANNO,IFLFL,MODE
0066        COMMON G(24),U(24),THDIFT,PAR1,ADAPT,LANEST
0067        EXTERNAL TPSET,THER0,THER1,THER2,THCUR,TSCN1,THPRO,THDED,THWND
0068        EXTERNAL THSET,TPCNT,TPCUR,TSCN2
0069        INTEGER DCPON,REFSIG,CTR,FIRPA,FIRSC,RESET,DATRDY,TN(24),XX
0070        INTEGER CONLO,CONHI
0071        REAL MULT
0072        DIMENSION THC(24), THK(24),TMP(24),P(24,25),Q(24),H(24),G1(24,24)
0073        DIMENSION UD(24),IA(2),TK(24, 2),T1(24),TP(24),TC(24),KML(24,24)
0074        DIMENSION ITIME(5),DC(24,24),AX(8),FX(8),TS(24,2),NO(24),INAM(3)
0075        EQUIVALENCE (AVG,IA(1))
0076        DATA INAM/2HDS,2HPL,2H3 /
0077         TS=160./60.
0078         DCPFLG=0
0079  C
0080        IF(M .EQ. 1)THDIFT=0
0081        IF(SCANNO .GT. 0)GOTO 544
0082        CALL RDVAL(THCUR,TH,M)
0083        CALL WRVAL(TSCN1,TH,M)
0084        ACERR=.02
0085        PAR1=0.6
0086        GAVE=-.0625
0087  544   IF(M .EQ. 25)GOTO 32
0088        G(M)=-.0625
0089        CALL RDVAL(THCUR,THCKA,M)       ——— 301
0090        CALL WRVAL(TSCN2,THCKA,M)
0091        CALL RDVAL(TSCN1,TFILT,M)
0092        FILT=.50                                          } 302
0093        THCKA=FILT*THCKA+(1.-FILT)*TFILT
0094        CALL WRVAL(THCUR,THCKA,M)
0095        THK(M) =  THCKA-2
```

```
0096            DO 78 I=1,24
0097            TMP(I) = TG(I,1)
0098         78 CONTINUE
0099            IF(DCPON .NE. 1)GOTO 200
0100            IF(ADAPT .NE. 1)GOTO 200
0101            THCKP=2
0102            DO 4 J=1,24
0103            KM=ABS(M-J)
0104            MULT=PAR1**KM
0105            IF(KM .GT. 4)MULT=0
0106            THCKP=THCKP+G(M)*TMP(J)*MULT
0107          4 CONTINUE
0108            THDIF=THCKP-THCKA
0109            THDIFT=THDIFT+ABS(THDIF)
0110            IF(ABS(THCKP-THCKA)/THCKA .LT. ACERR)GOTO 200
0111            DIV=0
0112        403 DO 727 I=1,24
0113            KM=ABS(M-I)
0114            MULT=PAR1**KM
0115            IF(KM .GT. 4)MULT=0
0116            DIV=DIV+MULT*TMP(I)
0117        727 CONTINUE
0118            G(M)   =THK(M)/DIV
0119            IF(M .EQ. 1)GOTO 404
0120            IF(G(M)    .GE. 0)G(M)   =G(M-1)
0121            GOTO 405
0122        404 IF(G(1)    .GE. 0)G(1)   =-.0625
0123        405 DCPFLG=1
0124        200 CALL RDVAL(TFSET,TMPSP,M)
0125            CALL RDVAL(THERO,TE1,M)
0126            CALL RDVAL(THER1,TE2,M)
0127            CALL RDVAL(THPRO,PB,M)
0128            CALL RDVAL(THDED,TI,M)
0129            CALL RDVAL(THWND,TD,M)
0130            CALL RDVAL(THSET,SET,M)
0131            CALL RDVAL(THCUR,TH,M)
0132            CALL RDVAL(TPCUR,TMPCU,M)
0133            THF=TH-8./64.*(TMPSP-TMPCU)
0134            TE=SET-THF
0135            CONLO=LANEST
0136            CONHI=25-LANEST
0137            IF(M .LE. CONLO .OR. M .GE. CONHI)GO TO 709
0138            IF(SCANNO .EQ. 0) THEN
0139            TE1=TE
0140            TE2=TE
0141            ENDIF
0142            IF(SCANNO .EQ. 1)TE2=TE1
0143        708 U(M)=100/PB*(TE-TE1+TS/TI*TE+TD/TS*(TE-2*TE1+TE2))
0144        709 CONTINUE
0145            CALL WRVAL(TSCN1,THCKA,M)
0146            CALL WRVAL(THERO,TE,M)
0147            CALL WRVAL(THER1,TE1,M)
0148            CALL WRVAL(THER2,TE2,M)
0149            IF(M .NE. 25)GOTO 30
0150     C
0151     C******** NOW CHECK TO SEE HOW MANY LANES ON EACH SIDE WILL BE NEGLECTED
0152     C
0153         32 IF(LANEST .NE. 3)GOTO 33
0154     C
0155     C******** USE THE ALGORITHM BELOW FOR 3 UNCONTROLLED LANES ON EACH SIDE
0156     C
0157         36 U(1)=.25*U(4)
0158            U(2)=.50*U(4)
0159            U(3)=.75*U(4)
0160            U(22)=.75*U(21)
0161            U(23)=.50*U(21)
0162            U(24)=.25*U(21)
```

```
0163          GOTO 35
0164       33 IF(LANEST .NE. 2)GOTO 34
0165  C
0166  C********* USE THE ALGORITHM BELOW FOR 2 UNCONTROLLED LANES ON EACH SIDE
0167  C
0168          U(1)=.33*U(3)
0169          U(2)=.67*U(3)
0170          U(24)=.33*U(22)
0171          U(23)=.67*U(22)
0172          GOTO 35
0173       34 IF(LANEST .NE. 1)GOTO 36
0174  C
0175  C******* USE THE ALGORITHM BELOW FOR 1 UNCONTROLLED LANE ON EACH SIDE
0176  C
0177          U(1)=.5*U(2)
0178          U(24)=.5*U(23)
0179       35 CONTINUE
0180          IF(DCPON .NE. 1)GOTO 31
0181          IF(ADAPT .NE. 1)GOTO 750
0182          CALL RDVAL(THSET,AVTHIK,12)
0183          IF(THDIFT/(24*AVTHIK)    .LT. .1)GOTO 666
0184          AL=PAR1-.3
0185          AH=PAR1+.3
0186          IF(AH .GT. .75)AH=.75
0187          IF(AL .LT. .25)AL=.25
0188          A=AL
0189          XX=1
0190          CALL RDVAL(THCUR,THC)
0191          DO 501 KNTR=1,6
0192      512 DO 502 K=1,24
0193          THK(K)=THC(K)-2
0194          DO 503 I=1,24
0195      503 TMP(I)=TG(I,1)
0196          DIV=0
0197          DO 504 I=1,24
0198          KM=ABS(K-I)
0199          MULT=A**KM
0200          IF(KM .GT. 4)MULT=0
0201      504 DIV=DIV+MULT*TMP(I)
0202      502 G(K)   =THK(K)/DIV
0203      507 XSUM=0
0204          DO 505 I=1,24
0205      505 XSUM=XSUM+G(I)
0206          GAVE=XSUM/24
0207          KWIT=0
0208          DO 506 I=1,24
0209          ERR=G(I)-GAVE
0210          IF(ABS(ERR)/GAVE .LT. .8)GOTO 506
0211          KWIT=1
0212          G(I)=GAVE
0213      506 CONTINUE
0214          IF(KWIT .EQ. 1)GOTO 507
0215          THDIF=0
0216          DO 508 K=1,24
0217          THCKP=2
0218          DO 509 I=1,24
0219          KM=ABS(K-I)
0220          MULT=A**KM
0221          IF(KM .GT. 4)MULT=0
0222      509 THCKP=THCKP+GAVE*TMP(I)*MULT
0223      508 THDIF=THDIF+ABS(THCKP-THC(K))
0224          IF(GAVE .GE. 0)THDIF=THDIF+1.E30
0225          IF(KNTR .NE. 1)GOTO 511
0226          IF(XX .GT. 8)GOTO 511
0227          AX(XX)=A
0228          FX(XX)=THDIF
0229          XX=XX+1
```

```
0230        A=A+.125*(AH-AL)
0231        IF(XX .NE. 9)GOTO 512
0232        FKEEP=1E30
0233        DO 513 I=1,8
0234        IF(FX(I) .GT. FKEEP)GOTO 513
0235        IKEEP=I
0236        FKEEP=FX(I)
0237    513 CONTINUE
0238        AS=AX(IKEEP)
0239        FS=FX(IKEEP)
0240        IL=IKEEP-1
0241        IF(IL .LE. 1)IL=1
0242        AL=AX(IL)
0243        IH=IKEEP+1
0244        IF(IH .GE. 8)IH=8
0245        AH=AX(IH)
0246        A=AL+.618*(AH-AL)
0247        GOTO 501
0248    511 F=THDIF
0249        IF(A .LT. AS)GOTO 514
0250        IF(F .GT. FS)GOTO 515
0251        AL=AS
0252        AS=A
0253        FS=F
0254        A=AL+.618*(AH-AL)
0255        GOTO 501
0256    515 AH=A
0257        A=AH-.618*(AH-AL)
0258        GOTO 501
0259    514 IF(F .GT. FS)GOTO 516
0260        AH=AS
0261        AS=A
0262        FS=F
0263        A=AH-.618*(AH-AL)
0264        GOTO 501
0265    516 AL=A
0266        A=AL+.618*(AH-AL)
0267    501 CONTINUE
0268        IF(ABS(PAR1-A) .LT. .03)GOTO 665
0269        PAR1=A
0270        DO 518 I=1,24
0271        G(I)=GAVE
0272        DO 518 J=1,24
0273    518 P(I,J)=0
0274    750 IF(ADAPT .NE. 1 .AND. SCANNO .GT. 0)GOTO 666
0275        DO 519 MM=1,24
0276        DO 520 I=1,24
0277        KM=ABS(I-MM)
0278        P(MM,I)=PAR1**KM
0279        IF(KM .GT. 4)P(MM,I)=0
0280    520 CONTINUE
0281        Q(I)=1.
0282    519 CONTINUE
0283        CALL GJR(P,Q,Q,24,0,NRET)
0284        IF(NRET .EQ. 0)GOTO 31
0285    762 DO 99 I=1,24
0286        DO 98 J=1,24
0287     98 GI(I,J)=P(I,J)/GAVE
0288        IF(GI(I,I) .NE. 0)GOTO 517
0289        H(I)=0
0290        GOTO 99
0291    517 H(I)=1/GI(I,I)
0292     99 CONTINUE
0293        DO 20 I=1,24
0294        DO 20 J=1,24
0295     20 DC(I,J)=GI(I,J)*H(I)
0296    665 PB=100*GAVE/.924
0297        DO 668 I=1,24
0298        CALL WRVAL(THPRO,PB,I)
```

```
0299        668 CONTINUE
0300        666     DO 21 I=1,24
0301                UD(I)=0.
0302                DO 22 J=1,24
0303                IF(ABS(J-I) .GT. 4)GOTO 22
0304                UD(I)=UD(I)+U(J)*DC(I,J)
0305         22 CONTINUE
0306         21 CONTINUE
0307                DO 25 I=1,24
0308         25 WRITE(1,202)I,U(I),UD(I)
0309        202 FORMAT(' I=',I4,' NORMAL CHANGE= ',F10.3,' DECOUPLED CHAN
GE=
0310          1 ',F10.3)
0311                IFLAG=1
0312                DO 26 I=1,24
0313                CALL RDVAL(TPSET,TMPST,I)
0314                TMPO=TMPST
0315                TMPST=TMPST+UD(I)
0316                IF(TMPST .LT. 25)TMPST=25
0317                IF(TMPST .GT. 250)TMPST=250
0318     C          WRITE(1,203)I,TMPO,TMPST
0319                CALL WRVAL(TPSET,TMPST,I)
0320         26 CONTINUE
0321                GOTO 40
0322         31     DO 27 I=1,24
0323                CALL RDVAL(TPSET,TMPST,I)
0324                CALL RDVAL(TPCUR,TMPCU,I)
0325                TMPO=TMPST
0326                TMPST=TMPST+U(I)
0327                IF(TMPST .LT. 25)TMPST=25
0328                IF(TMPST .GT. 250)TMPST=250
0329     C          WRITE(1,203)I,TMPO,TMPST
0330        203 FORMAT(' LANE',I3,' OLD TEMP SP:',F10.2,' NEW SP:',F10.2)
0331                CALL WRVAL(TPSET,TMPST,I)
0332         27 CONTINUE
0333         40 CALL EXEC(11,ITIME)
0334                CALL RDVAL(THSET,SET,12)
0335                WRITE(6,41)ITIME(4),ITIME(3),ITIME(2),SET
0336         41 FORMAT(/,10X,I2,':',I2,':',I2,5X,'TH. SETPT.=',F5.3)
0337                CALL RDVAL(THCUR,T1)
0338                CALL RDVAL(TPSET,TP)
0339                CALL RDVAL(TPCUR,TC)
0340                CALL RDVAL(TPCNT,TN)
0341                DO 301 L=1,24
0342                TN(L)=IAND(377B,TN(L))
0343        301 CONTINUE
0344                DO 712 JJ=1,24
0345        712 NO(JJ)=JJ
0346                DO 442 KK=1,2
0347                IL=1
0348                IH=12
0349                IF(KK .EQ. 1)GOTO 50
0350                IL=13
0351                IH=24
0352         50 WRITE(6,713)(NO(II),II=IL,IH)
0353                WRITE(6,43)(T1(II),II=IL,IH)
0354                WRITE(6,44)(TP(II),II=IL,IH)
0355                WRITE(6,45)(TC(II),II=IL,IH)
0356                WRITE(6,46)(TN(II),II=IL,IH)
0357        442 CONTINUE
0358                AVG=SET
0359     C          CALL EXEC(10,INAM, IA(1),IA(2))
0360         43 FORMAT(' THICK. ',12(2X,F6.3))
0361        713 FORMAT(/,' LANE #',12(4X,I2,2X))
0362         44 FORMAT(' TP.SP.',12(2X,F6.1))
0363         45 FORMAT(' TEMP ',12(2X,F6.1))
0364         46 FORMAT(' % ON ',12(2X,I6))
0365         30 IF(M .EQ. 25)SCANNO=SCANNO+1
0366                RETURN
0367                END
```

```
0001  FTN4,L
0002        SUBROUTINE GJR(A,C,X,N,INDIC,NRET)
0003        DIMENSION A(24,25),C(24),X(24),IROW(24),JCOL(25),JORD(25),Y(25)
0004  C ........BEGIN ELIMINATION PROCEDURE...........
0005        DO 10 I=1,N
0006     10 A(I,N+1)=C(I)
0007        MAX=N
0008        IF(INDIC .GE. 0)MAX=N+1
0009      5 DETER=1
0010        DO 18 K=1,N
0011        KM1=K-1
0012  C
0013  C        .........SEARCH FOR THE PIVOT ELEMENT............
0014        PIVOT=0
0015        DO 11 I=1,N
0016        DO 11 J=1,N
0017  C        .........SCAN IROW AND JCOL ARRAYS FOR INVALID PIVOT SUBSCRIPTS......
0018        IF(K .EQ. 1)GOTO 9
0019        DO 8 ISCAN=1,KM1
0020        DO 8 JSCAN=1,KM1
0021        IF(I .EQ. IROW(ISCAN))GOTO 11
0022        IF(J .EQ. JCOL(JSCAN))GOTO 11
0023      8 CONTINUE
0024      9 IF(ABS(A(I,J)) .LE. ABS(PIVOT)) GOTO 11
0025        PIVOT=A(I,J)
0026        IROW(K)=I
0027        JCOL(K)=J
0028     11 CONTINUE
0029  C
0030  C        .....INSURE THAT SELECTED PIVOT IS LARGER THAN EPS .........
0031        IF(ABS(PIVOT) .GT. 0.00001)GOTO 13
0032        NRET=0
0033        RETURN
0034  C
0035  C        ........UPDATE THE DETERMINANT VALUE ....................
0036     13 IROWK=IROW(K)
0037        JCOLK=JCOL(K)
0038        DETER=DETER*PIVOT
0039  C
0040  C        ........ NORMALIZE PIVOT ROW ELEMENTS ...................
0041        DO 14 J=1,MAX
0042     14 A(IROWK,J)=A(IROWK,J)/PIVOT
0043  C
0044  C        .........CARRY OUT ELIMINATION AND DEVELOP INVERSE .........
0045        A(IROWK,JCOLK)=1./PIVOT
0046        DO 18 I=1,N
0047        AIJCK=A(I,JCOLK)
0048        IF(I .EQ. IROWK)GOTO 18
0049        A(I,JCOLK)=-AIJCK/PIVOT
0050        DO 17 J=1,MAX
0051     17 IF(J .NE. JCOLK)A(I,J)=A(I,J)-AIJCK*A(IROWK,J)
0052     18 CONTINUE
0053  C
0054  C        ........ORDER SOLUTION VALUES (IF ANY) AND CREATE JORD ARRAY .......
0055        DO 20 I=1,N
0056        IROWI=IROW(I)
0057        JCOLI=JCOL(I)
0058        JORD(IROWI)=JCOLI
0059     20 IF(INDIC .GE. 0)X(JCOLI)=A(IROWI,MAX)
0060  C
0061  C        ........ADJUST SIGN OF DETERMINANT ..................
0062        INTCH=0
0063        NM1=N-1
0064        DO 22 I=1,NM1
```

```
0065            IP1=I+1
0066            DO 22 J=IP1,N
0067            IF(JORD(J) .GE. JORD(I))GOTO 22
0068            JTEMP=JORD(J)
0069            JORD(J)=JORD(I)
0070            JORD(I)=JTEMP
0071            INTCH=INTCH+1
0072        22 CONTINUE
0073            IF(INTCH/2*2 .NE. INTCH) DETER=-DETER
0074   C
0075   C       ........ IF INDIC IS POSITIVE RETURN WITH RESULTS ..........
0076            IF(INDIC .LE. 0)GOTO 26
0077            NRET=1
0078            RETURN
0079   C       ........ FIRST BY ROWS ......
0080        26 DO 28 J=1,N
0081            DO 27 I=1,N
0082            IROWI=IROW(I)
0083            JCOLI=JCOL(I)
0084        27 Y(JCOLI)=A(IROWI,J)
0085            DO 28 I=1,N
0086        28 A(I,J)=Y(I)
0087   C       ........ THEN BY COLUMNS .......
0088            DO 30 I=1,N
0089            DO 29 J=1,N
0090            IROWJ=IROW(J)
0091            JCOLJ=JCOL(J)
0092        29 Y(IROWJ)=A(I,JCOLJ)
0093            DO 30 J=1,N
0094        30 A(I,J)=Y(J)
0095   C
0096   C       .......RETURN FOR INDIC NEGATIVE OR ZERO
0097            NRET=1
0098            RETURN
0099            END
0001   ASMB,L
0002            NAM RDVAL,6    READ VALUE(S) FROM PIR DATA BASE
0003            EXT PIRSZ,DBADR,.ENTR
0004            ENT RDVAL
0005   ****************************************************************
       **********
0006   *       READ A VALUE FROM THE P.I.R. DATA BASE
              *
0007   *
              *
0008   *       CALL RDVAL(FIELD, BUFFER)           READ VALUES FOR ALL POI
NTS(24)       *
0009   *       CALL RDVAL(FIELD, VALUE, CHANNEL#)   READ ONLY CHANNEL#'S VA
LUE           *
0010   *
              *
0011   ****************************************************************
       **********
0012   FIELD BSS 1         P.I.R. DESIRED VALUE OR "FIELD"
0013   BUFFR BSS 1         USER'S BUFFER ADDRESS
0014   POINT BSS 1         P.I.R. NO. OR CHANNEL NO. DESIRED
0015   *
0016   RDVAL NOP
0017         JSB .ENTR
0018         DEF FIELD     GET PARAMETER ADDRESSES
0019   *
0020         CLB,INB
0021         LDA FIELD,I   GET DESIRED OFFSET INTO POINT RECORD
0022         ADA =D-2      IF OFFSET IS LESS THAN 2...
0023         SSA
0024         JMP *+4
0025         ADA =D-59     ... OR GREATER THAN 60, THEN ...
0026         SSA
0027         INB           ... NO. OF WORDS PER VALUE = 1, ELSE = 2.
```

```
0028            CMB,INB
0029            STB WDCNT       USE IT AS LOOP COUNTER
0030            STB SAVCT       ... & SAVE IT FOR LATER USE AGAIN
0031    *
0032            LDA BUFFR       SET UP USER-BUFFER POINTER ...
0033            STA BFPTR       ... FOR MOVING WORDS.
0034    *
0035    *       SET LOOP COUNTER FOR GETTING ALL OR ONE VALUE
0036            LDB =D24
0037            LDA POINT       GET ADDRESS IN "POINT"
0038            SZA             IF IT IS ZERO, THEN ALL VALUES ARE REQUESTED
0039            CLB,INB
0040            CMB,INB
0041            STB LPCNT       SAVE AS LOOP COUNTER
0042    *
0043            SZA,RSS         IF NO POINT GIVEN, GO GET IT ALL.
0044            JMP MPY
0045            LDA POINT,I     OTHERWISE, SET ADDRESS OF FIRST VALUE
0046            ADA =D-1        LESS ONE FOR FINDING ADDRESS
0047    MPY     MPY PIRSZ       TIMES THE SIZE OF A POINT RECORD
0048            ADA DBADR
0049            ADA FIELD,I
0050            STA VADDR       SAVE THIS ADDRESS FOR LATER USE
0051            STA VALAD       = ADDRESS OF VALUE
0052    LOOP    LDA VALAD,I     GET THE VALUE FROM THE P.I.R.
0053            STA BFPTR,I     PUT IT IN USER'S BUFFER
0054    *
0055            ISZ BFPTR       INCREMENT BUFFER POINTER
0056            ISZ VALAD       INCREMENT ADDRESS OF VALUE(LOOK AT NEXT WORD)
0057            ISZ WDCNT       BUMP WORD COUNTER
0058            JMP LOOP        IF WORD COUNT NOT ZERO, MOVE ANOTHER WORD
0059    *
0060    *   IF MORE THAN ONE VALUE WAS REQUESTED, LOOP TO GET THEM
0061            LDA VADDR       GET ADDRESS OF LAST VALUE FIELD (OFFSET),
0062            ADA PIRSZ       ADD THE P.I.R. SIZE ...
0063            STA VADDR       ... TO GET ADDRESS OF NEXT POINT'S VALUE FIELD.
0064    *
0065            LDB SAVCT       RETRIEVE WORD COUNT AGAIN
0066            STB WDCNT
0067    *
0068            ISZ LPCNT       HAVE WE GOTTEN EVERYTHING REQUESTED?
0069            JMP LOOP-1      IF NOT, KEEP GOING.
0070    *
0071    *
0072    *   RETURN TO CALLER
0073    *
0074            CLA             ELSE, SET ADDRESS IN "POINT" TO ZERO FOR SUBSEQUENT CALLS
0075            STA POINT
0076            JMP RDVAL,I     RETURN
0077    *
0078    *
0079    *   DATA STORAGE
0080    *
0081    BFPTR   BSS 1           POINTER INTO USER'S BUFFER
0082    WDCNT   BSS 1           COUNT OF WORDS PER VALUE TO MOVE ( 1 OR 2 )
0083    SAVCT   BSS 1           COPY OF ABOVE COUNT, BUT DOES NOT CHANGE
0084    LPCNT   BSS 1           LOOP COUNTER FOR ACCESSING ALL P.I.R.S OR JUST ONE
0085    VADDR   BSS 1           ADDRESS OF THE P.I.R. FIELD TO BE MOVED
0086    VALAD   BSS 1           ADDRESS OF THE P.I.R. WORD TO BE MOVED
0087    *
0088            END RDVAL
```

```
0001  FTN4X,L
0002  C************************************************************
0003  C**                                                         **
0004  C**              SUBROUTINE DARED(DATA,IB)                  **
0005  C**                                                         **
0006  C**           THICKNESS DATA REDUCTION ROUTINE              **
0007  C**                                                         **
0008  C**   This subroutine accepts the raw data from the LFE program **
0009  C**   for segment thickness and converts it into a buffer con- **
0010  C**   taining 24 lane thicknesses numbered from die bolt #1 to **
0011  C**   die bolt #24.  First, the routine examines the data to **
0012  C**   determine the locations of the two coating edges (where **
0013  C**   the thickness goes high on either side of the film).  **
0014  C**   Then the number of segments between the two edges is  **
0015  C**   calculated and the appropriate number of segments dis- **
0016  C**   carded on either side to result in 72 segments in the **
0017  C**   middle of the film which comprise the middle 18 bolts (4 **
0018  C**   segments per bolt).  Finally the segments at the edges **
0019  C**   are parcelled out as required to give thickness values **
0020  C**   for lanes #1-#3 and #21-#24, which are the lanes which **
0021  C**   experience neckdown.                                   **
0022  C**                                                         **
0023  C                                                         
0024  C**                                                         **
0025  C**                                                         **
0026  C**                                                         **
0027  C**                                                         **
0028  C**                                                         **
0029  C************************************************************
0030        SUBROUTINE DARED(DATA)
0031        DIMENSION DATA(150),THICK(24),DAT2(150)
0032        EXTERNAL THCUR,THSET
0033        INTEGER RGTEND
0034  C
0035  C
0036  C*****If average thickness is out of acceptable range, then exit.
0037  C
0038  C
0039        IF(DATA(1) .GT. 8.5 .OR. DATA(1) .LT. 5.0)GOTO 140
0040  C
0041  C
0042  C*****Find the right coating edge, RGTEND
0043  C
0044  C
0045        DO 100 I=3,20
0046        DIF=(DATA(I)-DATA(I-1))/DATA(1)
0047  C
0048  C*****The edge should be positive and have a slope of >30% of base line.
0049  C
0050        IF(DIF .LE. .3)GOTO 100
0051        IF((DATA(I+1)-DATA(I))/DATA(1)           .LE. -.5)GOTO 100
0052  C     IF(DATA(I).GT. -1.)GOTO 101
0053        GOTO 101
0054    100 CONTINUE
0055  C
0056  C*****Couldn't find the edge!  Test segment #2.
0057  C
0058        IF(DATA(2).GT.-1)RGTEND=2
0059        IF(RGTEND .NE. 2)RGTEND=4
0060        GOTO 102
0061  C
0062  C*****The right edge was found to occur on segment #I.
0063  C
0064    101 RGTEND=I
0065    102 CONTINUE
0066  C
0067  C*****Now use the same technique to locate the left coating edge,
```

```
LFTEND
0068  C
0069        DO 103 I=2,20
0070        J= 98-I
0071        DIF=(DATA(J)-DATA(J+1))/DATA(1)
0072        IF(DIF .LE..3)GOTO 103
0073        IF((DATA(J-1)-DATA(J))/DATA(1)          .LE. -.5)GOTO 103
0074  C     IF(DATA(J).GT. -1.)GOTO 104
0075        GOTO 104
0076    103 CONTINUE
0077        IF(DATA( 97) .GT.-1)LFTEND=97
0078        IF(LFTEND .NE.  97)LFTEND= 92
0079        GOTO 105
0080  C
0081  C*****The left edge was located at segment #J.
0082    104 LFTEND=J
0083  C
0084    123 FORMAT(' LEFT,RIGHT: ',I4,2X,I4)
0085  C
0086  C*****Now add the scan average to each deviation to get actual thickness(mils)
0087  C
0088    105 DO 120 I=2,105
0089        DAT2(I)=DATA(I)+DATA(1)
0090    120 CONTINUE
0091  C
0092  C*****Calculate the #segments of coating, RANGE.
0093  C
0094        WRITE(6,123)LFTEND,RGTEND
0095        RANGE=LFTEND-RGTEND
0096        IF(RANGE .GT. 72)GOTO 106
0097        L4EDGE=LFTEND
0098        ICUTL=0
0099        GOTO 107
0100  C
0101  C*****Establish the #segments of coating on left edge on bead, ICUTL
0102  C
0103    106 ICUTL=(RANGE-72)/2
0104  C
0105  C*****Calculate segment # of Lane 4 edge, L4EDGE.
0106  C
0107        L4EDGE=LFTEND-ICUTL
0108  C
0109  C******For Lanes 4 to 21, calculate the average thickness of the 4
0110  C******segments making up that lane and put in buffer, THICK
0111  C
0112    107 DO 108 LANE=4,21
0113        SMLAN=0
0114        LANEST=L4EDGE-(LANE-4)*4
0115        DO 109 I=1,4
0116        LSEG=LANEST+1-I
0117        SMLAN=SMLAN+DAT2(LSEG)
0118    109 CONTINUE
0119        THICK (LANE)=SMLAN/4
0120    108 CONTINUE
0121        ICUTR=RANGE-72-ICUTL
0122        IF(ICUTR .LE. 0)ICUTR=0
0123  C
0124  C*****Now calculate the segments on coating representing the neckdown
0125  C*****lanes (1-3 on left and 22-24 on right). Use the following algorithm:
0126  C
0127  C              Lane 3 or Lane 22 --- 50% of the bead width
0128  C              Lane 2 or Lane 23 --- 65% of the remainder
0129  C              Lane 1 or Lane 24 --- Remainder
0130  C
0131        LSEG3=INT(.5*ICUTL+.5)
```

```
0132            SMLAN=0
0133            DO 110 I=1,LSEG3
0134            SMLAN=SMLAN+DAT2(L4EDGE+I)
0135        110 CONTINUE
0136            THICK(3)=SMLAN/LSEG3
0137            L3EDGE=L4EDGE+LSEG3
0138            ICUT12=ICUTL-LSEG3
0139            LSEG2=INT(.65*ICUT12+.5)
0140            SMLAN=0
0141            DO 111 I=1,LSEG2
0142            SMLAN=SMLAN+DAT2(L3EDGE+I)
0143        111 CONTINUE
0144            THICK(2)=SMLAN/LSEG2
0145            L2EDGE=L3EDGE+LSEG2
0146            LSEG1=ICUT12-LSEG2
0147            IF(LSEG1 .LE. 0)GOTO 112
0148            SMLAN=0
0149            DO 113 I=1,LSEG1
0150            SMLAN=SMLAN+DAT2(L2EDGE+I)
0151        113 CONTINUE
0152            THICK(1)=SMLAN/LSEG1
0153            GOTO 114
0154        112 THICK(1)=THICK(2)
0155        114 LSEG22=INT(.5*ICUTR+.5)
0156            L22EDG=L4EDGE-73
0157            SMLAN=0
0158            DO 115 I=1,LSEG22
0159            SMLAN=SMLAN+DAT2(L22EDG +1-I)
0160        115 CONTINUE
0161            THICK(22)=SMLAN/LSEG22
0162            ICUT34=ICUTR-LSEG22
0163            LSEG23=INT(.65*ICUT34+.5)
0164            L23EDG=L22EDG-LSEG22
0165            SMLAN=0
0166            DO 116 I=1,LSEG23
0167            SMLAN=SMLAN+DAT2(L23EDG+1-I)
0168        116 CONTINUE
0169            THICK(23)=SMLAN/LSEG23
0170            LSEG24=ICUT34-LSEG23
0171            IF(LSEG24 .LE. 0)GOTO 117
0172            L24EDG=L23EDG-LSEG23
0173            SMLAN=0
0174            DO 118 I=1,LSEG24
0175            SMLAN=SMLAN+DAT2(L24EDG+1-I)
0176        118 CONTINUE
0177            THICK(24)=SMLAN/LSEG24
0178            GO TO 119
0179        117 THICK(24)=THICK(23)
0180        119 CONTINUE
0181    C
0182    C*****Fill the lane thickness buffer, THCUR, with the new calculated values.
0183    C
0184    C*****Now calculate the average thickness for lanes 4 to 21.
0185    C
0186            SUMR=0
0187            DO 308 I=4,21
0188        308 SUMR=SUMR+THICK(I)
0189            AVETH=SUMR/18
0190            CALL WRVAL(THCUR,THICK)
0191            DO 309 I=1,24
0192            CALL WRVAL(THSET,AVETH,I)
0193        309 CONTINUE
0194    C       WRITE(1,208)(THICK(L),L=1,24)
0195    C       WRITE(6,208)(THICK(L),L=1,24)
0196        208 FORMAT(15X,'LANE THICKNESS VALUES (mils)',/,3(2X,8(F6.3,1X),/))
0197        140 RETURN
0198            END
```

```
0001  ASMB,L
0002        NAM WRVAL,6   WRITE VALUE(S) TO PIR DATA BASE
0003        EXT PIRSZ,DBADR,.ENTR
0004        ENT WRVAL
0005  ***************************************************************
0006  *     WRITE A VALUE INTO THE P.I.R. DATA BASE FROM USER'S BUFFER
0007  *
0008  *     CALL WRVAL(FIELD, BUFFER)          WRITE VALUES FOR ALL POINTS(24)
0009  *     CALL WRVAL(FIELD, VALUE, CHANNEL#) WRITE ONLY CHANNEL#'S VALUE
0010  *
0011  ***************************************************************
0012  *
0013  FIELD BSS 1          P.I.R. DESIRED VALUE OR "FIELD"
0014  BUFFR BSS 1          USER'S BUFFER ADDRESS
0015  POINT BSS 1          P.I.R. NO. OR CHANNEL NO. DESIRED
0016  *
0017  WRVAL NOP
0018        JSB .ENTR
0019        DEF FIELD      GET PARAMETER ADDRESSES
0020  *
0021        CLB,INB
0022        LDA FIELD,I    GET DESIRED OFFSET INTO POINT RECORD
0023        ADA =D-2       IF OFFSET IS LESS THAN 2...
0024        SSA
0025        JMP *+4
0026        ADA =D-59      ... OR GREATER THAN 60, THEN ...
0027        SSA
0028        INB            ... NO. OF WORDS PER VALUE =1, ELSE=2.
0029        CMB,INB
0030        STB WDCNT      USE IT AS LOOP COUNTER
0031        STB SAVCT      ... & SAVE IT FOR LATER USE HERE
0032  *
0033        LDA BUFFR      SET UP USER-BUFFER POINTER ...
0034        STA BFPTR      ... FOR MOVING WORDS.
0035  *
0036  *     SET LOOP COUNTER FOR WRITING ALL OR ONE VALUE
0037        LDB =D24
0038        LDA POINT      GET ADDRESS IN "POINT"
0039        SZA            IF IT IS ZERO, ALL VALUES ARE REQUESTED
0040        CLB,INB
0041        CMB,INB
0042        STB LPCNT
0043  *
0044        SZA,RSS        IF NO POINT WAS GIVEN, GO GET IT ALL.
0045        JMP MPY
0046        LDA POINT,I    OTHERWISE, SET ADDRESS OF FIRST VALUE
0047        ADA =D-1         LESS ONE FOR GETTING ADDRESS
0048  MPY   MPY PIRSZ      TIME SIZE OF A POINT RECORD
0049        ADA DBADR
0050        ADA FIELD,I     ADD THE DESIRED OFFSET
0051        STA VADDR      SAVE THIS ADDRESS FOR LATER USE
0052        STA VALAD      = ADDRESS OF VALUE
0053  LOOP  LDA BFPTR,I    GET THE VALUE FROM THE USER'S BUFFER
0054        STA VALAD,I    PUT IT IN THE P.I.R.
0055  *
0056        ISZ BFPTR      INCREMENT BUFFER POINTER
0057        ISZ VALAD      INCREMENT ADDRESS OF VALUE(LOOK AT NEXT WORD)
0058        ISZ WDCNT      BUMP WORD COUNTER
0059        JMP LOOP       IF WORD COUNT NOT ZERO, MOVE ANOTHER WORD
0060  *
0061  *     IF MORE THAN ONE VALUE WAS REQUESTED, LOOP TO GET THEM
```

```
0062            LDA VADDR       GET ADDRESS OF LAST VALUE FIELD (OFFSET),
0063            ADA PIRSZ       ADD THE P.I.R. SIZE ...
0064            STA VADDR           ... TO GET ADDRESS OF NEXT POINT'S VALUE FIE
LD.
0065    *
0066            LDB SAVCT       RETRIEVE WORD COUNT
0067            STB WDCNT
0068    *
0069            ISZ LPCNT       HAVE WE GOTTEN EVERYTHING REQUESTED?
0070            JMP LOOP-1      IF NOT, KEEP GOING.
0071            CLA             ELSE, SET ADDRESS IN "POINT" TO ZERO FOR SUBSE
QUENT CALLS
0072            STA POINT
0073            JMP WRVAL,I     RETURN
0074    *
0075    *
0076    *   DATA STORAGE
0077    *
0078    BFPTR   BSS 1           POINTER INTO USER'S BUFFER
0079    WDCNT   BSS 1           COUNT OF WORDS PER VALUE TO MOVE ( 1 OR 2 )
0080    SAVCT   BSS 1           COPY OF ABOVE COUNT, DOES NOT CHANGE
0081    LPCNT   BSS 1           LOOP COUNTER FOR ACCESSING ALL P.I.R.S OR JUST
ONE
0082    VADDR   BSS 1           ADDRESS OF THE P.I.R. FIELD TO BE MOVED
0083    VALAD   BSS 1           ADDRESS OF THE P.I.R. WORD  TO BE MOVED
0084    *
0085            END WRVAL

&TSET  T=00004 IS ON CR00031 USING 00004 BLKS R=0000

0001    FTN4,L
0002            EXTERNAL TPSET,TPACH,TPACL,THPRO,THDED,THWND,THSET
0003            WRITE(1,301)
0004        301 FORMAT('  DO YOU WISH TO CHANGE TEMP LOOP SETUP (1=YES)?')
0005            READ(1,102)ITLP
0006            IF(ITLP .NE. 1)GOTO 15
0007            WRITE(1,201)
0008        201 FORMAT('  CHANGE SETPOINT FOR ALL LOOPS? (1=YES)')
0009            READ(1,102)KSP
0010            IF(KSP .NE. 1)GOTO 202
0011            WRITE(1,203)
0012        203 FORMAT('  SETPOINT?')
0013            READ(1,9)TSP
0014            DO 204 I=1,24
0015            CALL WRVAL(TPSET,TSP,I)
0016        204 CONTINUE
0017        202 CONTINUE
0018            WRITE(1,101)
0019        101 FORMAT('  CHANGE LAMBDA FOR ALL LOOPS? (1=YES)')
0020            READ(1,102)KLAM
0021        102 FORMAT(I1)
0022            IF(KLAM .NE. 1)GOTO 103
0023            WRITE(1,105)
0024        105 FORMAT('  LAMBDA?')
0025            READ(1,9)TLAM
0026            DO 104 I=1,24
0027            CALL WRVAL(TPACH,TLAM,I)
0028        104 CONTINUE
0029        103 WRITE(1,106)
0030        106 FORMAT('  CHANGE DERIVATIVE TIME FOR ALL LOOPS? (1=YES)')
0031            READ(1,102)KDER
0032            IF(KDER .NE. 1)GOTO 107
0033            WRITE(1,108)
0034        108 FORMAT('  DERIVATIVE TIME?')
0035            READ(1,9)TTDER
0036            DO 109 I=1,24
0037            CALL WRVAL(TPACL,TTDER,I)
0038        109 CONTINUE
0039        107 IF(KLAM .EQ. 1 .AND. KDER .EQ. 1 .AND. KSP  .EQ. 1)GOTO 302
0040            WRITE(1,1)
```

```
0041        1 FORMAT(' INDIVIDUAL LOOP (1) OR ALL LOOPS (2)?')
0042          READ(1,2)KIN
0043        2 FORMAT(I1)
0044          IF(KIN .EQ. 2)GOTO 3
0045          WRITE(1,4)
0046        4 FORMAT('  LOOP NO. (1 TO 24)?')
0047          READ(1,5)J
0048        5 FORMAT(I2)
0049          GOTO 7
0050        3 DO 6 J=1,24
0051          IF(KSP .EQ. 1)GOTO 151
0052        7 CALL RDVAL(TPSET,TSET,J)
0053          WRITE(1,8)J,TSET
0054        8 FORMAT(' BOLT NO.',I3,' CURRENT SP: ',F10.0,' NEW SP?')
0055          READ(1,9)TSET
0056          CALL WRVAL(TPSET,TSET,J)
0057      151 IF(KLAM .EQ. 1)GOTO 110
0058          CALL RDVAL(TPACH,TLAM,J)
0059          WRITE(1,10) J,TLAM
0060        9 FORMAT(F10.0)
0061       10 FORMAT(' BOLT NO.',I3,' CURRENT LAMBDA:',F10.0,' NEW LAMBDA?')
0062          READ(1,9)TLAM
0063          CALL WRVAL(TPACH,TLAM,J)
0064      110 IF(KDER .EQ. 1)GOTO 111
0065          CALL RDVAL(TPACL,TTDER,J)
0066          WRITE(1,11)J,TTDER
0067       11 FORMAT(' BOLT NO.',I3,' CURRENT TD:',F10.0,' NEW TD?')
0068          READ(1,9)TTDER
0069          CALL WRVAL(TPACL,TTDER,J)
0070      111 CONTINUE
0071          IF(KIN .EQ. 1)GOTO 15
0072        6 CONTINUE
0073      302 CONTINUE
0074       15 WRITE(1,401)
0075      401 FORMAT('    THICKNESS LOOP SETUP')
0076          WRITE(1,402)
0077      402 FORMAT(' DO YOU WISH TO CHANGE THICKNESS LOOP SETUP(1=YES)')
0078          READ(1,403)ANS
0079      403 FORMAT(F10.0)
0080          IF(ANS .NE. 1)GOTO 156
0081          WRITE(1,404)
0082      404 FORMAT(' THICKNESS SETPOINT (mils):')
0083          READ(1,405)THS
0084          DO 505 I=1,24
0085          CALL WRVAL(THSET,THS,I)
0086      505 CONTINUE
0087          WRITE(1,406)
0088      406 FORMAT(' THICKNESS PROPORTIONAL BAND (%):')
0089          READ(1,405)THP
0090      405 FORMAT(F10.0)
0091          DO 506 I=4,21
0092          CALL WRVAL(THPRO,THP,I)
0093      506 CONTINUE
0094          WRITE(1,407)
0095      407 FORMAT(' THICKNESS LOOP RESET TIME (minutes):')
0096          READ(1,405)THD
0097          DO 507 I=1,24
0098          CALL WRVAL(THDED,THD,I)
0099      507 CONTINUE
0100          WRITE(1,408)
0101      408 FORMAT(' THICKNESS LOOP DERIVATIVE TIME (minutes):')
0102          READ(1,405)THW
0103          DO 508 I=1,24
0104          CALL WRVAL(THWND,THW,I)
0105      508 CONTINUE
0106          THI=THP*3
0107          DO 545 I=1,3
0108          K=25-I
```

```
0109            CALL WRVAL(THPRO,THI,I)
0110            CALL WRVAL(THRPO,THI,K)
0111       545 CONTINUE
0112       156 CALL EXIT
0113            END
0001  FTN4,L
0002            PROGRAM PARDM
0003            DIMENSION TPT(24)
0004            REAL KPT(24)
0005            EXTERNAL TPPRO,TPWND
0006            CALL RDVAL(TPPRO,KPT)
0007            CALL RDVAL(TPWND,TPT)
0008            DO 3 I=1,2
0009            M=0
0010            IF(I .EQ. 2)M=12
0011            WRITE(6,1)(KPT(J),J=M+1,M+12)
0012            WRITE(6,2)(TPT(J),J=M+1,M+12)
0013         3 CONTINUE
0014         1 FORMAT(' GAIN    :',12(F6.3,3X))
0015         2 FORMAT(' TIME CONS:',12(F6.1,3X))
0016            CALL EXIT
0017            END
```

What is claimed is:

1. An extrusion coating apparatus comprising:

a first and second die member, one of which has a flexible lip thereon, the dies, when mounted in spaced-apart confronting relationship, cooperate to define an elongated extrusion slot having a slot thickness dimension;

a heat responsive expansion element mounted in the one of the dies in an operative relationship with the flexible lip thereon, the element being responsive to the flow of an electric current to expand to an extent corresponding to the magnitude of the current to commensurately modify the thickness dimension of the slot;

a temperature control network for maintaining the temperature of the heat responsive element within a predetermined range of a predetermined temperature set point corresponding to a predetermined slot thickness dimension by controlling the proportion of a predetermined time period during which current is permitted to flow through the heat responsive element;

a gauge for monitoring the thickness of an extrudate emanating from the extrusion slot and for generating a signal representative thereof;

means responsive to the signal representative of the thickness of the extrudate for generating the temperature set point; and, means associated with the temperature control network for generating after each time period a historical trend of the value of the proportion.

2. The coating apparatus of claim 1 wherein the means responsive to the thickness signal and the temperature control network comprises a host computer and a primary microcomputer, and wherein the means associated with the temperature control network comprises an auxiliary microcomputer.

3. The coating apparatus of claim 2 wherein the host computer determines the proportion of the predetermined time period and applies the same to the primary microcomputer, and the primary microcomputer being operatively associated with the heat responsive expansion element for controlling the same in accordance with the proportion received from the host computer.

4. The coating apparatus of claim 3 wherein the auxiliary microcomputer is operatively associated with the primary microcomputer to receive therefrom data representative of the proportion and to generate the historical trend in the form of a running average of the value of the proportion.

5. The coating apparatus of claim 4 wherein the primary microcomputer includes means for monitoring the application of the proportion from the host computer.

6. The coating apparatus of claim 5 further comprising:

means responsive to the absence of the application of the proportion from the host to the primary microcomputer for controlling the heat expansion element in accordance with the historical trend of the proportion generated by the auxiliary microcomputer.

7. A method for controlling an extrusion coating apparatus having an extrusion slot, the apparatus having a heat responsive element responsive to the flow of electric current to expand to an extent corresponding to the magnitude of the current to commensurately modify the thickness dimension of the slot comprising the steps of:

(a) monitoring the thickness of the extrudate;

(b) generating in a host computer a signal representative of the proportion of a predetermined time period during which current is permitted to flow through the heat responsive element;

(c) applying the proportion signal from the host to a primary microcomputer operatively associated with the heat expansion element to control the current flow through the element in accordance therewith;

(d) applying the proportion from the primary microcomputer to an auxiliary microcomputer to generate a historical trend of the value of the proportion; and (e) monitoring the application of the proportion signal from the host and, in the absence of the same, controlling the heat expansion element in accordance with the historical trend generated by the auxiliary microcomputer.

* * * * *